United States Patent
Baughman et al.

(10) Patent No.: US 6,555,945 B1
(45) Date of Patent: Apr. 29, 2003

(54) ACTUATORS USING DOUBLE-LAYER CHARGING OF HIGH SURFACE AREA MATERIALS

(75) Inventors: Ray H. Baughman, Morris Plains, NJ (US); Changxing Cui, Whippany, NJ (US); Ji Su, Highland Park, NJ (US); Zafar Iqbal, Morristown, NJ (US); Anvar Zakhidov, Randolph, NJ (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/379,132

(22) Filed: Aug. 20, 1999

Related U.S. Application Data
(60) Provisional application No. 60/121,576, filed on Feb. 25, 1999.

(51) Int. Cl.[7] ............... G02B 6/26; H01M 12/00; H01L 31/00

(52) U.S. Cl. ............... 310/300; 385/147; 385/22; 385/134; 429/9; 429/345; 429/346; 136/291

(58) Field of Search ............... 310/300; 385/22; 385/134, 147, 15, 39, 52; 429/9, 345, 346; 136/291; 216/56; 361/500

(56) References Cited

U.S. PATENT DOCUMENTS

| 5,429,893 A | 7/1995 | Thomas |
| 6,261,469 B1 * | 7/2001 | Zakhidov et al. ............ 216/56 |

FOREIGN PATENT DOCUMENTS

| JP | 11280639 | 10/1999 |
| WO | WO9907997 | 2/1999 |

OTHER PUBLICATIONS

Moshen Shahinpoor, Electro–Thermo–Mechanics of Resilent Contractile Fiber Bundles as Robotic Actuators, p. 1502–1507, May 13, 1994.

M. Shahinpoor, Microelecatro–Mechanics of Ionic Polymeric Gels as Artificial Muscles for Robotic Applications, p. 380–385, May 4, 1993.

"Conducting Polymer Electromechanical Actuators", R.H. Baughman et al., *Conjugated Polymeric Materials: Opportunities in Electronics, Optoelectronics, and Molecular Electronics*, pp 559–582, 1990, Kluwer Academic Publishers.

"Controlled Folding Of Micrometer–Sized Structures", Elisabeth Smela et al., *Science*, Vo. 268, pp. 1735–1738, Jun. 23, 1995.

"Soft and Wet Conducting Polymers for Artificial Muscles", Toribio F. Otero et al., *Advanced Materials*, vol. 10, No. 6, pp. 491–494, 1998.

(List continued on next page.)

Primary Examiner—Frank G. Font
Assistant Examiner—Michael P. Mooney
(74) Attorney, Agent, or Firm—Larry J. Palguta

(57) ABSTRACT

Actuators are described that operate as a result of double-layer charge injection in electrodes having very high gravimetric surface areas and gravimetric capacitances. The actuator output of the actuators may be a mechanical displacement that can be used to accomplish mechanical work. As a result of the non-faradaic process and the actuator materials utilized, such as carbon nanotubes, the actuators have improved work capacity, power density, cycle life, and force generation capabilities. Other benefits include low voltage operation and high temperature performance. The actuators also convert a mechanical energy input to an electrical energy output. The actuators may be used to control either thermal, electrical or fluid transport or cause either the switching, phase shift, or attenuation of electromagnetic radiation.

77 Claims, 14 Drawing Sheets

OTHER PUBLICATIONS

"Characterization and modelling of a conducting polymer muscle–like linear actuator", A. Della Santa et al., *Smart Materials Structure*, vol. 6, pp. 23–34, 1997.

"Mechanism of electromechanical actuation in polypyrrole", M.R. Gandhi et al., *Synthetic Metals*, vol. 73, pp. 247–256, 1995.

"'Artificial muscle': Electromechanical actuators using polyaniline films", K. Kaneto et al., *Synthetic Metals*, vol. 71, pp. 2211–2212, 1995.

"Conducting polymer artificial muscles", R.H. Baughman, *Synthetic Metals*, vol. 78, pp. 339–353, 1996.

"Fullerene Pipes", Jie Liu et al., *Science*, vol. 280, pp. 1253–1256, May 22, 1998.

"Unraveling Nanotubes: Field Emission from an Atomic Wire", A.G. Rinzler et al., *Science*, vol. 269, pp. 1550–1553, Sep. 15, 1995.

"Nanotubes as nanoprobes in scanning probe microscopy", Hongjie Dai et al., *Nature*, vol. 384, pp. 147–150, Nov. 14, 1996.

"Large–scale and low–cost synthesis of single–walled carbon nanotubes by the catalytic pyrolysis of hydrocarbons", H.M. Cheng et al., *Applied Physics Letters*, vol. 72, No. 25, pp. 3282–3284, Jun. 22, 1998.

"Large–scale production of single–walled carbon nanotubes by the electric–arc technique", C. Journet et al., *Nature*, vol. 388, pp. 756–758, Aug. 21, 1997.

"Fully collapsed carbon Nanotubes", nasreen G. Chopra et al., *Nature*, Vo. 377, pp. 135–138, Sep. 14, 1995.

"Carbon nano–cages created as cubes", Y. Saito et al., *Nature*, vol. 392, pp. 237, Mar. 19, 1998.

"Storage of hydrogen in single–walled carbon nanotubes", A. C. Dillon et al., *Nature*, Vo. 386, pp. 377–379, Mar. 27, 1997.

"Elastic strain of freely suspended single–wall carbon nanotube ropes", D.A. Walters et al., *Applied Physics Letters*, vol. 74, No. 25, pp. 3803–3805, Jun. 21, 1999.

"Intercalation and partial exfoliation of single–walled carbon nanotubes by nitric acid", C. Bower et al., *Chemical Physics Letters*, vol. 288, pp. 481–486, May 22, 1998.

"Raman scattering study of coalesced single walled carbon nanotubes", S.L. Fang et al., *Journal of Material Research*, vol. 13, No. 9, pp. 2405–2411, Sep., 1998.

"Natural Gas Storage", D.F. Quinn et al., *Carbon*, vol. 30, pp. 1097–1103, 1992.

"Methane Adsorption on Microporous Carbons–A Comparison of Experiment, Theory, and Simulation", P.N. Aukett, et al., *Carbon*, vol. 30, pp. 913–920, 1992.

"The Preparation and Properties of Activated Carbon Fibers Derived From Phenolic Precursor", Ruey Y. Lin et al., *Applied Polymer Symposia*, vol. 21, pp. 143–152, Aug., 1972.

"Influence of Activation Temperature on the Properties of Polyacrylonitrile–Based Activated Carbon Hollow Fiber", M.–C Yang, et al., *Journal of Applied Polymer Science*, vol. 68, pp. 1331–1336, 1998.

"Carbon Structures with Three–Dimensional Periodicity at Optical Wavelengths", Anvar A. Zakhidov, et al., *Science*, vol. 282, pp. 897–901, Oct. 30, 1998.

"Formation of Graphite Thin Film From Polyfurfuryl Alcohol and Polyvinyl Acetate Carbons Prepared Between The Lamellae of Montmorillonite", Naohiro Sonobe, et al., *Carbon*, vol. 29, pp. 61–67, 1991.

"A Novel Electrolyte Solvent for Rechargeable Lithium and Lithium–Ion Batteries", S.S. Zhang, et al., *Journal of Electrochemical Society*, vol. 143, No. 12, pp. 4047–4053, Dec. 1996.

"Scanning tunneling microscopy of monolayer graphite epitaxially grown on a TiC(111) surface", H. Itoh, et al., *Surface Science Letters*, vol. 254, pp. L437–L442, 1991.

"STM investigation of single layer graphite structures produced on Pt(111) by hydrocarbon decomposition", T.A. Land et al., *Surface Science*, vol. 264, pp. 261–270, 1992.

"Controlled Nanofabrication of Highly Oriented Pyrolytic Graphite with the Scanning Tunneling Microscope", Robin L. McCarley, et al., *Journel of Physical Chemistry*, vol. 96, No. 25, pp. 10089–10092, 1992.

"Electronic damping of vibrations in optical structures", Robert L. Forward, *Applied Optics*, vol. 18, No. 5, pp. 690–697, Mar. 1, 1979.

"High surface area carbon aerogels for supercapacitors", R. Saliger et al., *Journal of Non–Crystalline Solids*, vol. 225, pp. 81–85, 1998.

"Microrobots: Present and Future", John D. Madden et al., *Proceedings of the International Micromachine Symposium*, Nov. 1996, Tokyo, Japan, pp. 4–11.

*Handbook of Conducting Polymers*, Second Ed., Terge A. Skotheim et al.—editors, pp. 197–379, Marcel Dekker, Inc.—publishers, 1998.

"Large–scale purification of single–wall carbon nanotubes: process, product, and characterization", A.G. Rinzler et al., *Applied Physics A*, vol. 67, pp. 29–37, 1998.

"Formation of a Flexible Graphite Film from Poly(acrylonitrile) Using a Layered Clay Film as Template", Takashi Kyotani et al., *Chemical Materials*, vol. 6, pp. 2183–2142, 1994.

*Piezoelectric Actuators and Ultrasonic Motors*, Kenji Uchino, pp. 217–312, Kluwer Academic Publishers, 1998.

"Crystalline Ropes of Metallic Carbon Nanotubes", Andreas Thess et al., *Science*, vol. 273, pp. 483–487, Jul. 26, 1996.

\* cited by examiner

ACTUATORS USING DOUBLE-LAYER CHARGING OF HIGH SURFACE AREA MATERIALS

This application claims priority on Provisional Application No. 60/121,576 filed on Feb. 25, 1999, the entire contents of which are hereby incorporated by reference.

This invention was made with Government support under Contract No. N00173-99-C-2000 awarded by the Defense Advanced Research Projects Agency. The Government has certain rights in this invention.

BACKGROUND OF THE INVENTION

1. Field of the Invention

This invention relates to actuators based on electrochemical double-layer induced charge injection in materials having very high specific surface areas. Preferred embodiments include actuators for accomplishing mechanical work; the control of thermal, electrical, and fluid transport; and the switching, phase shift, and attenuation of electromagnetic radiation. The actuators range from large actuators to microscopic and nanoscale devices. These actuators are either directly powered by an externally provided electrical energy input or by chemical or photonic processes that generate electrical energy input. The electromechanical actuators can be operated in the reverse direction to convert an input mechanical energy to an output electrical energy.

2. Description of the Background Art

The background art includes various means for fabricating electromechanical actuators that are based on magnetostrictive, electrostrictive, ferroelectric, electrostatic, or shape-memory actuator processes. Each of these actuator processes has a disadvantage that prohibits an important category of applications. For example, the magnetostrictive, electrostrictive, and ferroelectric actuator processes suffer either from low achievable actuator strains (typically less than 0.1%) or a low modulus that limits the work capability per cycle. The need for high magnetic fields for the magnetostrictive actuator processes and large electric fields for the electrostrictive and ferroelectric actuator processes are other significant disadvantages for important applications.

Faradaic conducting polymer electrochemical actuators were proposed about a decade ago [R. H. Baughman et al., in *Conjugated Polymeric Materials: Opportunities in Electronics, Optoelectronics, and Molecular Electronics*, eds. J. L. Bredas and R. R. Chance (Kluwer, Dordrecht), pp 559–582 (1990)]. Examples of such devices have been described by E. Smela, O. Inganäs, and I. Lundström, *Science* 268, 1735 (1995); T. F. Otero and J. M. Sansinena, *Adv. Mater.* 10, 491 (1998); A. Della Santa, D. De Rossi, and A. Mazzoldi, *Smart Mater. Struct.* 6, 23 (1997); M. R. Gandhi, P. Murray, G. M. Spinks, and G. G. Wallace, *Synthetic Metals* 73, 247 (1995); J. D. Madden, P. G. Madden, I. W. Hunter, S. R. Lafontaine, and C. J. Brenan, Proceedings—Workshop on Working in the Micro-World, IEEE IROS96, Osaka Japan, p. 9–18, November 1996; and K. Kaneto, M. Kaneko, Y. Min, and A. G. MacDiarmid, *Synthetic Metals* 71, 2211 (1995).

Conventional faradaic conducting polymer electromechanical actuators operate by the diffusion of dopant ions to and from solid electrode elements in response to an applied potential. As a result of such diffusion, ions are either inserted or de-inserted from solid electrode elements. As a result of the volume change produced by such dopant insertion and de-insertion processes, the electrodes change dimension and this dimensional change produces the actuator stroke. These ion insertion and de-insertion processes are balanced by electron injection and removal from opposing electrodes. While this electron injection and removal could conceivably produce dimensional changes, these dimensional changes are much smaller than those due to the ion insertion and de-insertion processes for all devices that have been demonstrated. For example, ions having large volume (such as perchlorate) are inserted by diffusion into the conducting polymer electrode, and structurally change the solid polymer by pushing apart polymer chains to cause a dimensional change of the conducting polymer electrode.

Although there has been major development effort focused on making practical devices in accordance with this conventional technology, critically important problems remain. The major problem is that the required dopant insertion and de-insertion processes (called intercalation and de-intercalation) result in slow device response, short cycle lifetimes, hysteresis (leading to low energy conversion efficiencies), and an actuator response that depends on both rate and device history. Such conducting polymer electromechanical actuators use the large faradaic dimensional changes that result from the electrochemical doping of various conducting polymers, such as polypyrroles, polyanilines, polyalkylthiophenes, and polyarylvinylenes. Depending upon the dopant species and whether or not they include solvating species, dimensional changes of from 10% to 30% are conceptually obtainable. Since these dimensional changes occur in weakly bonded directions, the elastic modulus for these directions is low, which limits actuator performance.

There has been a proposal to make an actuator that uses the smaller dimensional changes that are in fiber or sheet directions (R. H. Baughman, *Synthetic Metals* 78, 339 (1996)). A further proposal in *Synthetic Metals* 78 is an electromechanical actuator that operates analogously to non-faradaic supercapacitors, instead of by the insertion and de-insertion of dopant species in a solid polymeric electromechanical electrode. As proposed, such theoretical non-faradaic actuators might use the change in length of a polymer chain, a graphite sheet, a fiber, or a nanofiber that results from a change in charge. However, although design approaches are suggested, the key problem as recognized in *Synthetic Metals* 78 is construction of a practical non-faradaic actuator having very high surface area without destroying mechanical properties. Without both the high surface area and high mechanical properties, a useable mechanical actuator can not be made. The point is that porosity must be introduced in order to obtain high surface area for an actuator electrode having macroscopic dimensions. Known fabrication methods for constructing an actuator electrode having porosity results in actuator electrodes that have mechanical properties reduced to such an extent as to be non-usable. For example, efforts to make an actuator from the high-surface-area carbon fibers produced by Unitika Ltd. failed, since these fibers could not support a useful load in an actuator environment. Moreover, the construction of a useful actuator requires that the actuator electrodes are highly electronically conducting, and the introduction of high surface area is expected to degrade electrical conductivity. Consequently, no viable way was available to make a non-faradaic actuator that could serve a useful function.

For example, the suggested approach in *Synthetic Metals* 78 of using carbon nanotubes was unrealizable because the required fabrication and purification technology was unavailable for either the precursor nanotubes or any macroscopic form of such nanotubes, such as nanotube sheets. The synthetic methods available when *Synthetic Metals* 78 was published produced nanotubes only as one component among extremely high concentrations of many other components (like fullerenes and weakly bonded carbon particles) that would eliminate the possibility of making a useful actuator. Moreover, the available nanotube samples included major concentrations of chiral and zigzag nanotubes that are semiconducting or insulating. The presence of such poorly conducting tubes would be expected to hinder charge injection, thus eliminating the possibility of obtaining useable actuation. The possibility of using actuators based on the aggregates of carbon nanofibers would be unworkable since no useable method was available for making such aggregates (either as films or fibers) that had the. required surface areas, electrical conductivities, mechanical properties, and freedom from massive contamination levels of degradative impurities. Likewise, it was impossible to make nanoscale actuators since no methods were available to make the electrical and mechanical contacts that were needed for a successful device. Also, no method was available for surrounding the nanoscale actuator with required electrolyte without causing a degradation of the structure of the nanoscale actuator.

The possible application of graphite sheets as actuators was conjectured in *Synthetic Metals* 78. The graphite sheets mentioned were individual sheets of graphite having molecular thicknesses (sub-nanometer). There was no available technology that would result in either the synthesis of large, free-standing sheets having molecular thicknesses or the construction of actuators from either substrate-bound large area sheets, microscopic area sheets, or nanoscale area sheets. Hence, a useable technology was not available for making actuators of any size from single graphite sheets. Likewise, although the possibility of making nano-faradaic actuators from conducting organic polymers was conjectured in *Synthetic Metals* 78, no method was suggested for obtaining the large gravimetric surface areas and large gravimetric capacitances that would enable the application of these materials in non-faradaic actuators.

Moreover, conventional ferroelectric actuators for converting mechanical energy to electrical energy suffer from low electrical energy densities per cycle, as well as poor efficiencies for low frequency operation (because of a significant inter-electrode leakage current through the ferroelectric). Also, various intercalation-based actuators have been evaluated in the past for actuator application in which the actuator response is a change in electrical conductivity, optical absorption, or surface energy. However, each of these devices suffer from cycle life and cycle rate limitations due to the dopant intercalation that is associated with charge injection. Moreover, there is a need for actuators that are multifunctional, such as a fabric for clothing that can be electrically driven between states allowing different degrees of thermal conductivity and water and air permeability. There is currently no satisfactory technology for making such actuators.

SUMMARY OF THE INVENTION

An object of the invention is to provide a mechanical actuator simultaneously having extremely high work capacities (per actuator volume or per actuator weight), high power densities (per actuator volume or per actuator weight), high cycle life, and high force generation capabilities. In addition, low voltage operation and high temperature performance are sought.

A further object is to provide an improved actuator for converting electrical energy to mechanical energy; for mechanical dampening or mechanical stiffness change; for the control of fluid flow; for the control of electrical currents and voltages; for the control of heat transport; and for the switching, phase shift, or attenuation of electromagnetic radiation. Conventional actuators do not use non-faradaic processes and devices based on other types of processes have major deficiencies.

The invention provides actuators for converting electrical energy to an actuator output and alternatively for converting a mechanical energy input to electrical energy. Such actuators can provide high work capacity, high power density, high cycle life and high force generation capability. Also, these actuators can provide low voltage operation and high temperature performance. In addition, actuators of the invention are useful for the control of thermal, electrical and fluid transport and for the switching, phase shift, and attenuation of electromagnetic radiation.

The above noted objects and others are fulfilled by an actuator having:

at least one ionically conducting and electronically insulating electrolyte; and at least two electrically conducting electrodes separated by said at least one electrolyte, at least one electrode of said at least two electrically conducting electrodes being a porous solid with a skeletal density in gm/cm$^3$ of $\rho$ having an accessible gravimetric surface area of at least 150 $\rho^{-1}$ m$^2$/gm and an accessible gravimetric capacitance of at least 5 $\rho^{-1}$ F/gm and having pores containing an electrolyte that is ionically conducting, the at least one electrode undergoing an actuator response that provides, in whole or in part, an actuator output upon non-faradaic charge injection responsive to application of an electrical voltage to said at least two electrically conducting electrodes.

The objects are also fulfilled by an electromechanical actuator having:

at least one ionically conducting and electronically insulating electrolyte;

at least two electrically conducting electrodes separated by said at least one electrolyte, at least one electrode of said at least two electrically conducting electrodes being a porous solid having an accessible gravimetric surface area of at least 150 m$^2$/gm and an accessible gravimetric capacitance of at least 5 F/gm, having pores containing an electrolyte that is ionically conducting and having a mechanical modulus of at least 0.5 GPa, the at least one electrode undergoing a dimensional change that provides, in whole or in part, an actuator output upon non-faradaic charge injection responsive to application of an electrical voltage to said at least two electrically conducting electrodes.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will be more clearly understood and further applications will be apparent when reference is made to the following detailed description of preferred embodiments of the invention which are given by way of illustration only, and thus are not limitative of the present invention, and wherein.

DETAILED DESCRIPTION OF THE PREFERRED EMBODIMENTS

Figure 1:
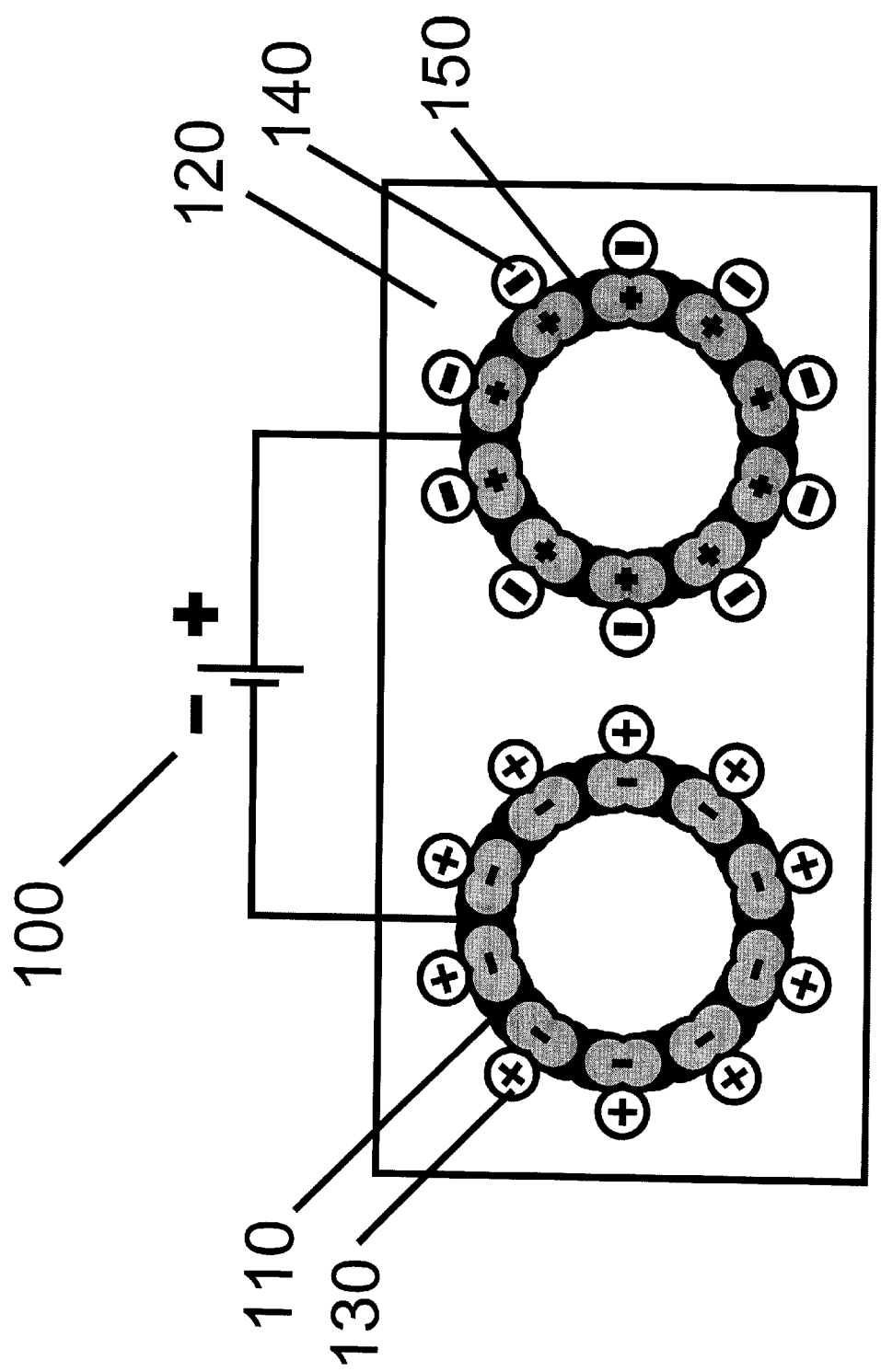
FIG. 1 illustrates charge injection for a non-faradaic electromechanical actuator based on non-bundled (isolated) carbon single-wall nanotubes.

The preferred embodiments are directed to a new type of actuator that can be used for accomplishing work; for converting electrical energy to mechanical energy; for mechanical dampening or mechanical stiffness change; for the control of fluid flow; for the control of electrical currents and voltages; for the control of heat transport; and for the switching, phase shift, or attenuation of electromagnetic radiation. The new technology can displace current technologies for actuation, as well as enable applications where conventional technologies are not practical. The inventive technology can be applied to provide both large actuators and microscopic actuators.

The actuators of the preferred embodiments generally include at least three elements: an anode, a cathode and an electrode separator material that comprises an electrolyte. The operation of these actuators is based on the substantially non-faradaic charging of an extremely high surface area material that is used as an electrode. The high surface area results in high electrode specific capacitance which results in electrically induced charge injection, which is largely compensated by the formation of an electrochemical double layer in the electrolyte. Specifically, in the non-faradaic process of the preferred embodiments, the ions from the electrolyte that compensate the electronic charges (holes or electrons) injected into the electrodes are located at the surface of electrode elements. This is in contrast to the faradaic processes of the conventional actuators wherein the ions that compensate the injected electronic charges penetrate inside the actuator electrode material and physically change the structure of the electrode material without substantially generating porosity, in the actuator electrode material. Because the double layer is formed in the non-faradaic process of the preferred embodiments, ions from the electrolyte need not penetrate or diffuse into the electrode material and need not cause irreversible phase changes within the electrode material. The actuators of the preferred embodiments thus have higher work capacity, cycle life and force generation than the conventional faradaic actuators. Moreover, the actuators of the preferred embodiments are capable of achieving improved low voltage operation and high temperature performance.

The differentiation between faradaic and non-faradaic processes is important for understanding the invention. Since these terms have been used in various ways in the literature, it is important to emphasize the way in which these terms are used herein. Significant amounts of electronic charge can be injected (i.e., stored) in an electrode only if counter ions of opposite charge are available in close proximity to the injected electronic charge on the electrode. These counter ions can compensate the electrostatic repulsion of the electronic charges on the electrode, thereby enabling the electronic charge injection process to proceed to high levels. A substantially faradaic process is one in which electronic charge that is injected into an electrode is more than 50% compensated by ions that are injected into the electrode volume. For the case where the electrode is electrolyte filled, the term electrode volume means-the volume of the electronically conducting electrode component (as opposed to the ionically conducting electrode component).

In contrast, a substantially non-faradaic process is one in which the electronic charge is more than 50% compensated by ions that reside on the surface area of the electrode. The term electrode surface area means the surface area of the electronically conducting component of the electrode, and includes all accessible internal and external surface. Electronic charge injection can result in the introduction of new surface area for the electrode volume, such as by separating carbon nanotube bundles. In such a case, the decision on whether the process is faradaic or non-faradaic is made using the charge state that corresponds to the highest surface area for the electrode surface. Evidence of faradaic charging processes is provided by the existence of peaks in cyclic voltamograms (current versus voltage plots at constant voltage scan rates). In contrast, non-faradaic devices provide currents that only weakly depend on voltage when operated in a voltage range wherein the electrolyte is neither reduced nor oxidized and wherein exfoliation of nanotube bundles does not occur.

The actuators of the preferred embodiments can generally be over driven using high applied potentials so that substantial amounts of faradaic charging occur at one or more electrodes. Such device operation will generally degrade actuator cycle life and device response time per cycle. An actuator is called a non-faradaic actuator as long as there is a device operation range where a useful device response can be obtained from predominately non-faradaic charging.

Figure 2:
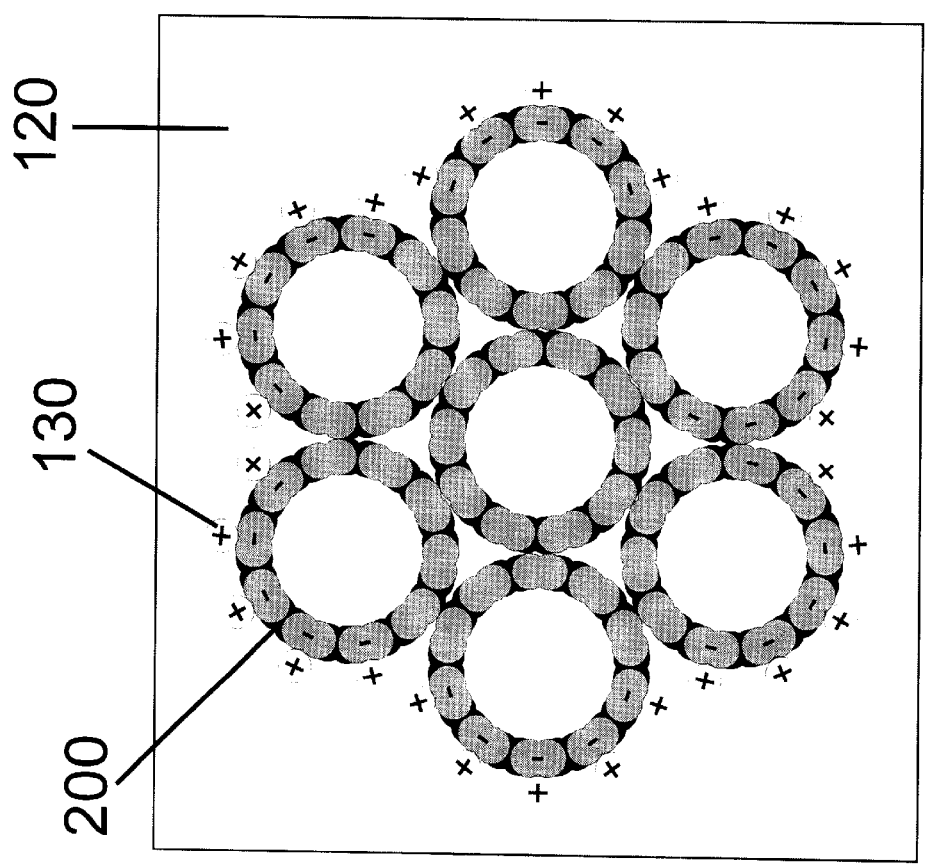
FIG. 2 illustrates charge injection for a bundled array of single-wall carbon nanotubes.

FIGS. 1 and 2 schematically illustrate and explain the concept of using non-faradaic electrochemical charging of carbon nanotubes for converting electrical energy to mechanical energy. Comparison of these figures shows that processes that decrease surface area (in this case fiber bundling) decrease the desired non-faradaic charging.

FIG. 1 illustrates the mechanism of charge injection for an electromechanical actuator based on non-bundled (i.e., isolated) carbon single-wall nanotubes. An applied potential from a power source 100 injects charge of opposite sign in the two pictured single-wall carbon nanotube electrodes 110 and 150 (shown in a projection along the tube-axis direction). Electrodes 110 and 150, which are in an electrolyte 120, are electronically charged negatively and positively, respectively, by power source 100. These indicated electronic charges within electrodes 110 and 150 are completely balanced by ions from electrolyte 120, which are attracted by the respective electronic charges and located at the surfaces of electrodes 110 and 150. The positive ions (cations) from electrolyte 120 attracted to the surface of electrode 110 are denoted by the charged spheres 130 and the negative ions (anions) from electrolyte 120 attracted to the surface of electrode 150 are denoted by charged spheres 140. Thus, respective double-layer charges are formed at the surface of each electrode from ions of the electrolyte 120 and the injected electronic charge, in accordance with a non-faradaic process. The pictured single nanotube electrodes represent an arbitrary number of nanotubes in each electrode that mechanically and electrically act in parallel. Depending upon the potential and the relative number of nanotubes in each electrode, the opposite electrodes can provide either in-phase or out-of-phase mechanical deformations, as will be described later.

FIG. 2 illustrates the mechanism of charge injection for a bundled array of single-wall carbon nanotubes that form an actuator electrode. The indicated negative electronic charges injected at the surface of a bundle of individual single-wall nanotubes 200 are balanced by the cations 130 from electrolyte 120. Although not indicated, electrolyte 120 may penetrate to some extent into interstitial sites and nanotube cores. The nanotube bundle of FIG. 2 contains far fewer nanotubes than nanotube sheets, which will be described hereinafter in specific examples, wherein the importance of nanotube bundling for reducing the effective surface area is enhanced. Since the individual nanotubes 200 of FIG. 2 are bundled together, the double-layer charge at the surface of each nanotube is reduced as compared with the isolated nanotube of FIG. 1.

It is generally most preferable for both the working and counter-electrodes of the actuator devices to operate non-faradaically. However, actuator devices in which one electrode operates non-faradaically and the second electrode operates faradaically are also preferred. Hence, actuator devices in which ions predominately insert on the surface of one electrode and in the volume of the second electrode are included in the preferred category.

As generally described, the actuators of the preferred embodiments are based on the substantially non-faradaic charging of an extremely high surface area material that is used as an electrode. Such actuators based on non-faradaic charging can provide an actuator response without the necessity of faradaic intercalation (ion insertion) and de-intercalation (ion de-insertion) processes, which generally produce major changes in the weight of a working or counter electrode in conventional faradaic actuators. The electrode weight change required to obtain a useful response for the actuators of the preferred embodiments is preferably less than about 10%, more preferably less than 5%, and most preferably less than 3%. If the electrode is electrolyte filled, this electrode weight change means the weight change of the electronically conducting component of the electrode. The simplest method for determining the electrode weight change when operating an actuator electrode in a liquid electrolyte is to weigh the actuator electrode in the initial dry state and after charging to the maximum actuator potential, and after washing with salt-free liquid component for the electrolyte and drying.

The actuator types of the preferred embodiments necessarily have at least one electrode having high gravimetric surface area. The gravimetric surface area is conveniently taken as the surface area measured in nitrogen gas by the standard Brunauer-Emmett-Teller (BET) method. The high surface area material has a skeletal density in units of $gm/cm^3$ of $\rho$. The gravimetric surface area of at least one electrode is preferably above about $150 \rho^{-1}$ $m^2/gm$, more preferably above about $300 \rho^{-1}$ $m^2/gm$, and most preferably above about $1000 \rho^{-1}$ $m^2 gm$. Both the working and counter electrodes should preferably have very high specific surface area. This electrode gravimetric surface area for both working and counter electrodes is preferably above $150 \rho^{-1}$ $m^2/gm$, where $\rho$ is the electrode skeletal density in $gm/cm^3$.

It is noted that the term $\rho$ as used corresponds to skeletal density and is a dimensionless quantity. For instance, if the skeletal density of a given material is 2 gm/cm, $\rho=2$ and $\rho^{-1}=\frac{1}{2}$. The skeletal density is the density that the material would have if it were free of pore space. This skeletal density is a conventionally defined quantity that can be conveniently determined by measuring the weight of the porous solid in vacuum ($W_V$) and the weight of the porous solid ($W_F$) in a fluid of known density ($d_F$) that substantially penetrates the pore space. The skeletal density is then $d_F W_V/(W_V-W_F)$. In order to avoid the necessity of making surface energy corrections, the fluid used for measurement is preferably a gas, such as nitrogen.

The high surface area of the preferred embodiments results in a high electrode specific capacitance, which is preferably above about $5 \rho^{-1}$ F/gm, more preferably above about $15 \rho^{-1}$ F/gm, and most preferably above about $50 \rho^{-1}$ F/gm. The specific capacitance is preferably derived using the conventional method from the scan rate dependence of the difference in the slope of specific current versus voltage on increasing voltage and decreasing voltage scans (using essentially identical working and counter electrodes). The above specific capacitances for the preferred, more preferred, and most preferred embodiments are the maximum values that can be measured in the stability range of the electrolyte.

Such electrode capacitance results in electrically induced charge injection that is largely compensated by the formation of an electrochemical double layer in the electrolyte. This charge injection results in the actuator performance for accomplishing work; converting electrical energy to mechanical energy; for mechanical dampening and mechanical stiffness change; for the control of fluid flow; for the control of electrical currents and voltages; for the control of heat transport; and for the switching, phase shift, and attenuation of electromagnetic radiation. When mechanical stress is applied to the actuator, this large surface area and a stress-dependent degree of charge injection results in the conversion of mechanical energy to electrical energy.

The above preferred gravimetric surface areas and capacitances refer to the maximum value that is achieved during device operation. This clarification is important since charging processes can result in changes in the gravimetric surface areas and capacitances, such as by causing the exfoliation of structures. Whether or not faradaic processes lead to this exfoliation, the device is referred to as a non-faradaic actuator as long as a useful actuator output results for final charged states for which the charging is predominately non-faradaic. The terms "accessible gravimetric surface areas" and "accessible gravimetric capacitances" can be conveniently used to specify that the values indicated are the maximum values achievable during actuator operation. Unless otherwise indicated, the gravimetric surface areas and gravimetric capacitances refer, respectively, to accessible gravimetric surface areas and accessible gravimetric capacitances, respectively.

The actuation results from the effect of non-faradaic charge injection on one or more electrodes. This charge injection substantially changes the dimension, surface energy, an optical property, or an electrical property of one or more high surface area electrodes. The corresponding actuator response is a mechanical displacement; control of thermal, electrical, or fluid transport; or either the switching, phase shift, or attenuation of electromagnetic radiation.

For an actuator that uses only one electrode to directly provide the actuator response, this electrode is called the actuation electrode and the other required electrode is called the counter electrode. In the most preferred embodiments for non-microscopic actuators, the counter electrode is also an actuation electrode. It is most especially preferred that these two electrically conducting electrodes are electrolyte filled porous solids that (a) undergo an actuator response upon non-faradaic charge injection and (b) have a gravimetric surface area of at least 150 $m^2$/gm and a capacitance of at least 5 F/gm.

In order to obtain rapid device response (without the necessity of faradaic processes in the electrolyte that can degrade cycle life) the total surface area of the counter electrode should preferably be at least as large as that of the actuation electrode. If a more rapid actuator response is required, it is preferred that the total surface area of the counter electrode is at least about ten times larger than that of the actuation electrode. For microactuators, it is most preferred that the total surface area of the counter electrode is at least about one hundred times larger than that of the actuation electrode. In order to maximize actuator response rate, it is further preferred for the largest dimension of the counter electrode to be at least about a factor of ten times the largest linear dimension of the actuation electrode. More preferably for this case, the largest linear dimension of the counter electrode is at least a factor of one hundred times the largest linear dimension of the actuation electrode.

With further regard to the rate of actuator response, the rate response (as a fraction of the maximum achievable response) increases with increasing values of $(R_S C_S)^{-1}$, where $R_S$ is the effective resistance of the actuator system and $C_S$ is the effective capacitance of the actuator system. Key contributions to $R_S$ can come from the resistivities of the actuator electrodes, the resistivity of the electrolyte for ionic conduction, and the resistivities of ionic electrolyte pathways in the porous electrode that is filled with electrolyte. Consequently, it is preferred that the actuator device contains at least one electrode having an electronic conductivity at room temperature that is above 1 S/cm. More preferably at least one actuator electrode has an electronic conductivity at room temperature that is above 100 S/cm. Most preferably at least one electrode has an electronic conductivity at room temperature that is above 1000 S/cm. Most especially preferred, the actuator device contains at least two electrodes that each has an electronic conductivity at room temperature that is above 1000 S/cm. In general the electrical conductivities of nanotube assemblies will be anisotropic. In such case the conductivities referred to above are those within the plane of biaxially oriented nanotube sheets, in the maximum conductivity direction for uniaxially oriented nanotube sheets, and in the fiber direction for oriented fiber assemblies.

The ratio of the electronic conductivity of the electrode to the electronic conductivity of the electrolyte is also an important parameter for obtaining useful actuator performance. The reason for minimizing the electronic conductivity of the electrolyte (while maximizing the ionic conductivity of the electrolyte and the electronic conductivity of the electrode) is that the electronic conductivity of the electrolyte has the effect of partially electronically connecting the actuator electrodes, thereby degrading actuator response. The ratio of the electronic conductivity of the highest conductivity electrode to the electronic conductivity of the electrolyte is preferably above $10^5$.

The actuator response rate (as a fraction of the maximum achievable response) decreases with decreasing pore size in the porous electrode, since the effective ionic resistance for ion diffusion increases. Also, the maximum actuator response after long wait times is decreased if the pore size is too small, since the pore size can be comparable to the electrolyte double-layer thickness (typically about 20 Å). Consequently, it is preferred (in order to obtain most useful rates and ultimate responses) that pore size not be too low. Preferably, more than 25% of the pore volume that is either two-dimensionally accessible or three-dimensionally accessible by the electrolyte has an effective radius of above 20 Å for at least one electrode of the actuator.

Also, the following ranges for electrode thicknesses result from these rate considerations, since ions must move through the electrolyte in order to reach the internal surface area of the electrode. It is preferred that at least one of the two required electrodes has an average thickness in it's narrowest dimension of less than 10 millimeters for the case where these electrodes are not substantially interpenetrating. More preferably this thickness should be less than 1 millimeter, most preferably this thickness should be less that 0.5 millimeter, and most especially preferably this thickness should be less than 0.1 millimeters.

In addition, the actuator response is enhanced for the more poorly conducting electrolytes by minimizing the average thickness of electrolyte that separates the two required actuator electrodes. The maximum electrolyte thickness that separates the two required electrodes is preferably less than 1 millimeter when these electrolytes are either solid-state electrolytes or organic electrolytes. More preferably this average electrolyte thickness is less than 0.1 millimeters for solid-state and organic electrolytes. However, for highly conducting ionic fluids (such as aqueous salts like aqueous NaCl, aqueous bases like aqueous KOH, and aqueous acids like aqueous sulfuric acid) much larger inter-electrode separations can be used without adversely effecting actuator performance.

Either the anode or the cathode or both electrode elements are very high surface area electrically conducting material. Various high-surface-area materials are useful for the construction of such electrode elements. Preferred examples include (a) metallic compositions obtained by the degenerate doping of semiconductors (such as Si, Ge, mixtures of Si and Ge, and GaAs), (b) conducting forms of conjugated organic polymers (such as polyacetylene, poly(p-phenylene), or poly (p-phenylene vinylene) and copolymers thereof), (c) carbonaceous materials obtained by the pyrolysis and surface area enhancement of polymers, (d) graphite, carbon nanotubes, linear fullerene polymers, and less ordered forms of carbon formed by pyrolysis, (e) elemental metals and alloys of these metals, and (f) electrically conducting metal oxides and metal sulfides.

Very high surface area organic conducting polymers are among the more preferred compositions. Especially preferred organic conducting polymers are those with planar or nearly planar backbones, such as poly(p-phenylene), poly (p-phenylene vinylene), and polyacetylene. The synthesis of conducting polymers suitable for the preferred embodiments is well known, and is described, for example, in the Handbook of Conducting Polymers, Second Edition, Eds. T. A. Skotheim et al. (Marcel Dekker, New York, 1998).

Various methods can be used to obtain conducting polymer actuator electrodes having high surface areas. For example, a very thin film of conducting polymer (preferably less than 10 nm thick) can be polymerized on the surface of a sacrificial substrate material, such as a plastic nanofiber made by electrostatic spinning methods. Such polymerization can be by electro-polymerization if the substrate is a conductor. More generally, the polymerization of the conducting polymer can be from a solution of the monomer and an oxidation agent (which can also include other additives that serve as dopants). Removal of the sacrificial material (such as by dissolution of a plastic substrate, which is preferably in fiber form) results in the high surface area conducting polymer.

The most preferred compositions for actuators include those based on elemental carbon, especially carbon nanofibers or graphite. Graphite is most especially preferred to be in the form of either exfoliated graphite or isolated graphite sheets. Preferred carbon fibers include multi-wall nanotubes (which exhibit concentric graphite sheets), single-wall nanotubes (which exhibit a single cylindrical graphite sheet), carbon fiber scrolls (a spirally wound graphite sheet), and carbon fibers with radial alignment (in which graphite planes extend radially about the fiber direction). Individual nanotubes of some of these unusual forms of carbon are themselves hollow solids, since single-wall nanotubes, multi-wall nanotubes, and nanofiber scrolls usually have hollow interiors that can be filled with various materials. The number-average diameter of single-wall and multi-wall carbon nanotubes used for actuators is preferably below about 10 nm. The term number-average diameter means the ordinary average of the diameters of the nanotubes, without any special weighting according to the size of the diameter.

Single-wall carbon nanotubes are especially preferred. Carbon single-wall nanotubes can have armchair, zigzag, or chiral arrangements of carbon atoms. These nanotubes are differentiated in that the armchair nanotubes have a circumference consisting of para-connected hexagonal rings (like found in poly(p-phenylene)), the zigzag nanotubes have a circumference that consists of linearly side-connected hexagonal rings (like found in linear acenes), and the chiral nanotubes differ from the armchair and zigzag nanotubes in that they have a sense of handedness. The armchair carbon single-wall nanotubes are most preferred, since these single-wall nanotubes have a metallic electrical conductivity, while about two thirds of the zigzag and chiral nanotubes are semiconducting. More specifically, it is preferred that an actuator electrode comprising carbon single-wall nanotubes consists predominately of armchair nanotubes.

Because of convenience of synthesis and their performance in actuators, (10, 10) nanotubes are most especially preferred. These nanotubes have a circumference that consists of a circular belt containing ten para-connected phenylene rings. The preference for the (10, 10) nanotubes results from their metallic electrical conductivities, small diameter (about 1.5 nm for the carbon shell), and the recent availability of convenient synthesis routes. The diameter for the covalent multi-wall nanofibers having a number-average diameter of less than about 10 nm are also included in the more preferred compositions, especially for electromechanical actuators.

The dual laser method, the chemical vapor deposition (CVD) method, and the carbon-arc method are preferred methods for making the carbon nanotubes, especially single-wall carbon nanotubes. The dual laser synthesis, purification and processing of single-wall nanotubes has been described in the following references: J. Liu et al., Science 280, 1253 (1998); A. G. Rinzler et al., Applied Physics A 67, 29 (1998); A. G. Rinzler et al, Science 269, 1550 (1995); and H. Dai, et al., Nature 384, 147 (1996). The CVD method described by Cheng et al. (Appl. Phys. Lett. 72, 3282 (1998)) involves the pyrolysis of a mixture of benzene with 1 to 5% thiophene or methane, using ferrocene as a floating catalyst and 10% hydrogen in argon as the carrier gas. The nanotubes form in the reaction zone of a cylindrical furnace held at 1100–1200° C. Depending on the concentration of the thiophene, the nanotubes form as bundles of single-wall or multi-wall tubes. Another useful method for growing single-wall nanotubes involves methane as precursor, ferric nitrate contained on an alumina catalyst bed, and a reaction temperature of 1000° C. The carbon-arc method of nanotube preparation has been described by C. Journet et al., Nature 388, 756 (1997); N. G. Chopra, et al., Nature 377, 135 (1995); Y. Saito and T. Matsumoto, Nature 392, 237 (1998); and A. C. Dillon, et al., Nature 386, 377 (1997).

The nanotubes made by these above noted methods are contaminated by major impurity concentration that should preferably be removed. This impurity concentration is typically above 50% for single-wall nanotubes. The purification of single-wall nanotubes made by the above methods is preferably accomplished using the method described by Lui et al. in Science 280, 1253 (1998). This method involves refluxing the reaction product of the above products in 2.6 M nitric acid for 45 hours, suspending the nanotubes in pH 10 NaOH aqueous solution using a surfactant (Triton X-100 from Aldrich, Milwaukee, Wis.), followed by filtration using a cross-flow filtration system. The carbon nanotubes made by the laser method are preferred for use in electromechanical actuators.

Sheets of single-wall nanotubes are especially preferred. Simple processes can be used for forming carbon nanotube sheets, and the same methods can be used for making sheets of other fiber types that are used for the electrodes in the preferred embodiments. Preferred methods for making these sheets are by (1) filtration of a dispersion of carbon nanotubes in a carrier liquid and (2) disposition of a mixture of carbon nanotubes and polymeric electrolyte in a carrier liquid, followed by evaporation of the carrier fluid. Single-wall carbon nanotubes suitable for the practice of the preferred embodiments can be purchased commercially as an aqueous suspension from Tubes@Rice (Rice University, Houston, Tex.). A nanotube sheet can be conveniently formed by filtering an aqueous suspension of such purified carbon tubes through poly(tetrafluoroethylene) filter paper, as described by Lui et al. in Science 280, 1253 (1998). Peeling the resulting paper-like sheet from the filter results in a black, freestanding sheet of carbon nanotube bundles. This sheet, which can conveniently range in thickness from 0.1–100 microns, possesses mechanical strength, which is derived from the micro-scale entanglement of the nanotube bundles. In order to increase the mechanical properties of these sheets for the actuator application, it is preferable for the nanotube sheets to be annealed at a temperature of at least 400° C. for 0.5 hour or longer prior to use in the actuator. More preferably, these nanotube sheets should be annealed at a temperature of at least 1000° C. for 0.5 hour or longer in either an inert atmosphere or a hydrogen-containing atmosphere. In order to preserve the nanotube structure, this anneal temperature is preferably below 2000° C. Also, the nanotubes within the nanotube sheet are preferably either biaxially oriented within the plane of the sheet or mechanically drawn to provide a degree of uniaxial orientation.

A published method for forming nanotube sheets uses about a 0.6 mg/ml aqueous suspension of nanotubes. In contrast, much more dilute concentrations are here found to provide increased mechanical properties that are especially desirable for actuator applications. The concentration of nanotubes self-assembled by filtration of an aqueous suspension of the nanotubes is preferably from below about 1 mg/ml, more preferably below about 0.5 mg/ml, and most preferably below about 0.1 mg/ml. However, while such low concentrations of nanotubes in suspension lead to increased mechanical properties, higher concentrations are satisfactory when it is more important to minimize processing cost than to maximize mechanical properties. Centrifugation can be used, either separately or together with filtration, in order to aggregate the nanotubes or other actuator materials into sheets. Also, for nanofibers (like the carbon nanotubes) that are commonly charged, electric fields between the deposition substrate (or previously deposited nanotubes) and an immersed counter electrode can be used to modify the deposition process.

In a further preferred embodiment, nanotube electrodes may be deposited on a conducting surface by deposition from a dispersion of nanotubes in a liquid, such as dichloroethane or water, which contains a surfactant (such as triton X-100 from Aldrich, Milwaukee, Wis.). Electrical contact to the nanotubes can be through a contacting electrically conducting surface or wire, and the counter electrode can be immersed in the electrolyte that covers this conducting substrate. Micro-lithographic techniques can be used to obtain patterned depositions and to anchor the nanotubes on the substrate. For example, either one or both ends of an individual tube can be pinned to the substrate by an overlayer, so that a controllable length of the nanotube is left uncovered. Such nanotubes can be conveniently tethered to surfaces for the assembly of nanoscale actuators using chemical processes that have been recently developed for carbon nanotubes. For example, J. Liu et al. (Science 280, 1253 (1998) have shown that single-wall nanotubes can be anchored on a gold substrate by terminating open nanotube ends with carboxylic acid groups (using an acid treatment process), converting these groups to the corresponding acid chloride (by room temperature reaction with $SOCl_2$), and then producing an amide linkage (by exposure to $NH_2(CH_2)_{11}SH$ in toluene at room temperature). Such functionalized nanotubes readily react at gold nano-sphere surfaces or planar gold surfaces, thereby providing a way to anchor individual nanotubes for the construction of nanoscale actuators or arrays of nanoscale actuators. In a further preferred embodiment, such nanotube arrays may be used as smart surfaces (such as surface deposited actuators to control fluid hydrodynamics at a surface).

A useful solution to the challenging problem of firmly mechanically and electrically contacting individual single-wall nanotubes or single-wall nanotubes bundles (without constraining movement at locations away from contact points) has been recently described by D. A. Walters et al. in Applied Physics Letters 74, 3803–3805 (1999). Using advanced micro-lithographic techniques, these authors demonstrated that single-wall nanotubes could be rigidly attached on opposite ends (both electrically and mechanically), so that they are suspended over a microscopic trench. The same novel lithographic methods are applicable for making a microscopic actuator based on carbon single-wall nanotubes. In fact, one of the etchant solutions used by these authors (aqueous KOH) is a preferred electrolyte for the actuators of the preferred embodiments.

The overall electrical conductivity of carbon nanotube electrodes depends upon the way that the nanotubes are assembled to make a bulk electrode. For instance, an assembly process that results in poorly conducting interconnections between nanotubes within nanotube sheets can result in a maximum electrode conductivity that is far below 1 S/cm, and therefore unsuitable. In fact, electrode fabrication processes that do not result in satisfactory inter-tube percolation have resulted in electrode conductivities that are too low to be even conveniently measured. However, the nanotube assembly method of Example 1 can provide an electrical conductivity of 5000 S/cm. Such high conductivities are important. Most preferably, the maximum electrical conductivity of the carbon nanotube electrode is above 1000 S/cm for the most conducting electrode.

The achievement of high conductivities for large actuator electrodes based on less than millimeter length fibers, such as carbon nanofibers, depends on the aspect ratio of these fibers—since this aspect ratio determines the number of inter-fiber electrical contacts per fiber length. For this reason, the number-average aspect ratio (length-to-diameter ratio) of fibers used for actuator electrodes is preferably above 1000. For actuators that use carbon nanotubes as sheets, it is preferable that these sheets have an in-plane Young's modulus that is above 0.5 GPa and that these sheets contain nanotubes that are primarily aligned biaxially within the sheet plane. X-ray diffraction measurements on the nanotube sheets prepared as in Example 1 shows this desired biaxial nanotube alignment, as well as a Youngs' modulus of between 1 and 5.5 GPa. Without a Youngs' modulus at least as high as 0.5 GPa, inferior actuator performance results even for actuator applications that do not require high stress generation. The predominately biaxial alignment of fibers improves the desired in-plane electrical conductivity and mechanical properties by maximizing the number of inter-fiber contacts. The number-average fiber length between inter-fiber contacts divided by the fiber diameter is preferably below 100, and more preferably below 10.

The mechanical properties of nanofiber sheets can be optimized for the actuator application by using methods for (1) selectively forming covalent bonding at the inter-tube junction points, (2) nanotube surface derivatization methods that improve bonding without degrading coulombic expansion coefficients, and (3) solid electrolyte filling processes that lead to inter-tube stress transfer. Methods for breaking the nanofiber bundles apart can be applied for forming high strength sheets from non-bundled nanotubes. For example, nitric acid doping followed by dopant de-intercalation has been found to exfoliate nanotube bundles, thereby resulting in isolated nanotubes (see C. Bower et al., Chemical Physics Letters 288, 481 (1998)). Other well known acceptor and donor agents for carbon nanotubes can also be used for the purpose of producing isolated nanotubes, especially if the doping process is to a high dopant level and the de-intercalation process is conducted rapidly (preferably by thermal annealing at above about 200° C. or by reaction with a dopant compensation agent).

Largely non-bundled nanotubes are most preferred for use as electromechanical actuators, as well as for other actuator applications where high charge injection and rapid switching is required. The weight fraction of the nanotubes that are non-bundled is preferably above about 50%, more preferably above 75%, and most preferably above 90%. The average number of carbon nanotubes in a bundle is preferably less than about 50, more preferably less than about 30, and most preferably less than about 10. The preference for isolated nanotubes over bundled nanotubes results from the higher effective surface area that can be obtained for non-bundled nanotubes. As a result of this higher effective surface area, the non-bundled nanotube can provide a higher specific capacitance than bundled nanotubes. This leads to a higher actuator response for a given change in applied voltage for the non-bundled nanotubes. This effect of bundling in reducing the effective surface area and specific capacitance may be appreciated in view of FIGS. 1 and 2. A very effective method for decreasing the bundle diameter is to subject bundled nanotube arrays to extreme redox potentials in an electrochemical cell. This aspect means that the performance of nanotube actuators can be enhanced by slowly cycling these actuators up to the redox stability limit of the electrolyte, and even beyond this limit, during an initial break-in treatment for these actuators.

The carbon nanotubes can have either open or closed ends. Open ends are required if nanotube filling is used to optimize charge transfer. Such open ends can be generated either by chemical etching using an oxidizing acid (like $HNO_3$), by partial oxidation in an oxygen-containing atmosphere, or by plasma etching.

Various methods can be used for increasing the mechanical strength of the nanofiber sheets by improving interfiber binding. Such increase of mechanical properties is desired in the preferred embodiments where an actuator is used to do mechanical work. One method is to cause preferential formation of a covalent bond at the inter-fiber contact points. Another method is to use microwave sintering or pulse discharge heating (either in an inert atmosphere or a reactive atmosphere) to provide inter-fiber junctions. Also, a secondary material can be used to provide improved interfiber binding. This can be done by adding a secondary material to the interfiber junction points. As an example, diethynylbenzene polymer can be deposited from solution at the inter-fiber crossing points, and then graphitized. Much simpler, the pores of the nanotube sheets can be infiltrated with an ionically conducting polymer, which provides the desired stress transfer between nanotubes. Alternately, a nanotube composite in a ionically conducting matrix, such as an ionically conducting polymer, can be formed as a strong shaped object by commingling the nanotubes with the ionically conducting material prior to the formation of the shaped object, such as a sheet. Such composites are considered to comprise a porous electrode that is filled with an electrolyte as long as the electrode material is percolated (i.e., forms a continuous structure) in the electrolyte.

Optimization of the diameter of the carbon single-wall nanotubes is useful for maximizing the degree of double-layer charge transfer. For example, high temperature annealing causes coalescence within nanotube bundles—thereby increasing the fiber diameter (S. L Fang et al., J. Materials Research 13, 2405 (1998)). This annealing is preferably accomplished at approximately 1500° C. in flowing hydrogen (2 sccm) for about four hours. Such increase in nanotube diameter can facilitate the penetration of electrolyte inside the nanotube, which can increase the achievable degree of double-layer charging.

In a preferred embodiment, the two required actuator electrodes and the electrolyte are mutually interpenetrating. For example, such an interpenetrating structure can be obtained for carbon nanotubes by the following steps (1) deposit a low density nanotube sheet from an aqueous nanotube dispersion and make electrical contact, (2) coat the fibers of the said nanotube fiber sheet with a solid-state electrolyte, such as phosphoric acid/poly(vinyl alcohol), leaving unfilled sheet volume, (3) deposit additional nanotubes in the thereby obtained sheet so that interfiber percolation occurs, (4) attach the second electrode contact to the nanotubes infiltrated in step 3, and (5) fill the residual void volume with either liquid or solid-state electrolyte.

In addition to the growth and assembly of nanofibers, various other methods are useful in the preferred embodiments for making high surface area materials for actuator electrodes. Methods commonly employed for increasing the surface of ordinary forms of carbon (such as steam activation, carbon dioxide, and KOH activation) can be used, although these methods do not provide materials having the very high strengths that are desirable for electromechanical actuators. Such methods are described by D. F. Quinn and J. A. MacDonald in Carbon 30, 1097 (1992), by P. N. Aukett et al. in Carbon 30, 913 (1992), and by R. Y. Lin and J. Economy in Applied Polymer Symposium, No. 21, 143 (1973). A preferred method for making high surface area carbon fibers is described by M. -C. Yang and D. -G. Yu in Journal Applied Polymer Science 68, 1331 (1998). This method involves the spinning of hollow fibers of polyacrylonitrile using water as the coagulation liquid, the oxidation of these fibers under load at 230° C. for 7 hours, and fiber pyrolysis and activation at 1000° C. for 40 minutes in nitrogen atmosphere and then heating for 40 minutes at a temperature of 600° C. to 1000° C. in carbon dioxide.

Another preferred way to make the high-surface-area materials used in he preferred embodiments is by the templating of a self-assembled structure hat has high surface area. For example, a periodic template crystal (called an opal) can be obtained by the sedimentation of spheres that are substantially monodispersed in diameter. These spheres preferably have an average sphere diameter of between 500 nm and 10 nm. In most preferred cases these spheres are from either (a) an inorganic oxide, such as $SiO_2$, which can be removed by chemical processes such as exposure to aqueous acid or base, or (b) an organic polymer that can be removed by pyrolysis, chemical reaction, or dissolution. The template crystal, after a preferred sintering process to provide intersphere necks, is infiltrated with either the actuator material or a material that can be converted to the actuator material. This sintering process in described by Zakhidov et al. in Science 282, 897 (1998). Thereafter, the template material is removed to provide an inverse lattice, which is a structural replica of the original template crystal. As an example, Zakhidov et al. (Science 282, 897 (1998)) used plasma-enhanced CVD to make a very high surface area graphitic carbon. Millimeter thick opal plates based on monodispersed $SiO_2$ spheres were infiltrated with carbon from a hydrogen/methane plasma created by microwave excitation. Extraction of the $SiO_2$ spheres from the carbon infiltrated opal (using aqueous HF) resulted in a very high surface area, nanoporous foam in which carbon layers as thin as 40 Å make the internal surface of the foam. An electron diffraction pattern from cubic graphite provides diffraction spacings close to that of ordinary graphite: 3.43 Å for (002), 2.10 Å for (100), 1.72 Å for (004), and 1.23 Å for (110).

Graphitic carbon plates and plate arrays having very high surface area are especially preferred for actuators. One method for making such carbons for either large or microscopic actuators involves the use of the known ability of organic molecules like furfuryl alcohol to intercalate clays (such as montmorillonite), and pyrolyze within these clays to make isolated graphite sheets—which can be extracted from the clay using aqueous HF (see T. Kyotani, T. Mori, and A. Tomita, Chem. Mater. 6, 2138 (1994) and N. Sonobe, T. Kyotani, and A. Tomita, Carbon 29, 61 (1991)). The isolated nanoscale graphite sheets do not themselves form strong structures in which the single sheet structure is preserved. Hence, in neat form they are unsatisfactory for use in large electromechanical actuators and in reasonably sized electromechanical microactuators. However, a structure suitable for electrodes of such actuators can be obtained as a shaped object by first commingling the isolated graphite sheets with a polymeric electrolyte. Then the graphite/electrolyte composite can be formed as a shaped object by solution or melt deposition methods leading to the percolation of the nanoscale graphite sheets within this electrolyte matrix. The desired mechanical properties are then achieved as a result of inter-sheet stress transfer via the electrolyte matrix.

Aerogels, and especially carbon aerogels and aerogels based on conducting organic polymers, are included in the list of preferred actuator electrode materials. However, because of their generally low strength, aerogels are generally not preferred for use as electromechanical actuator electrodes that provide the actuator displacement. Resorcinal-formaldehyde derived carbon aerogels are especially preferred carbon aerogels. These carbon aerogels can be conveniently produced using the sol gel method, supercritical drying using liquid $CO_2$, and pyrolysis in nitrogen at about 1000° C. The synthesis of these carbon aerogels is described by Salinger et al. in Journal of Non-Crystalline Solids 225, 81 (1998).

Various inorganic and organic liquid, gel, and solid electrolytes can be used for the electrochemical devices of the preferred embodiments. There are tradeoffs between these different electrolyte types with respect to the allowable temperature and voltage operating ranges and the obtainable electrical conductivities. The actuators of the preferred embodiments work in ordinary salt solutions (such as 1 M NaCl). This result contrasts with that for electromechanical actuators based on the faradaic doping of conjugated polymers, and indicates that the actuators of the preferred embodiments can operate in seawater for marine applications. Also, these actuators can be used for medical applications in which the electrolyte is either blood or normal saline. For these application embodiments, blood and seawater are preferred electrolytes. Salts of alkali metal cations and halogens are included in the especially preferred electrolyte compositions. The environmental stability of the carbon nanotubes that have been electron injected (such as by applying a high negative potential in salt water) contrasts with the case of conducting polymers for which no n-doped composition is environmentally stable.

Very high ionic conductivity electrolytes (like concentrated aqueous KOH and sulfuric acid) are preferred for devices that provide the most rapid responses. Aqueous electrolytes comprising at least about 4 M aqueous $H_2SO_4$ or 4 M aqueous KOH are especially preferred. Aqueous electrolytes comprising about 38 weight percent $H_2SO_4$ and electrolytes comprising above 5 M aqueous KOH are most especially preferred. For cases where a large device response range is more important than device response rate, electrolytes with large redox windows are preferred, since an increased voltage range increases the achievable device response range. Most preferred organic electrolytes include propylene carbonate, ethylene carbonate, butylene carbonate, diethyl carbonate, dimethylene carbonate, and mixtures thereof with salts such as $LiClO_4$, $LiAsF_6$, $LiPF_6$, $LiBF_4$, $LiCF_3SO_3$, $Li(CF_3SO_2)_2N$, and $Li(CF_3SO_2)_3C$.

Solid-state electrolytes can also be used advantageously, since such electrolytes enable all-solid-state devices. More preferred organic-based solid-state electrolytes are polyacrylonitrile-based solid polymer electrolytes (with salts such as potassium, lithium, magnesium, or copper perchlorate, $LiAsF_6$, and $LiN(CF_3SO_2)_2$). More preferred organic solvents for these solid-state and gel electrolytes include propylene carbonate, ethylene carbonate, γ-butyrolactone, and mixtures thereof. Preferred gel or elastomeric solid electrolytes include lithium salt-containing copolymers of polyethylene oxide (because of high redox stability windows, high electrical conductivities, and achievable elastomeric properties), electrolytes based on the random copolymer poly(epichloridrin-co-ethylene oxide), phosphoric acid containing nylons (such as nylon 6,10 or nylon 6), and hydrated poly(vinyl alcohol)/$H_3PO_4$. Other preferred gel electrolytes include polyethylene oxide and polyacrylonitrile-based electrolytes with lithium salts (like $LiClO_4$) and ethylene and propylene carbonate plasticizers. The so called "polymer in salt" elastomers (S. S. Zhang and C. A. Angell, J. Electrochem. Soc. 143, 4047 (1996)) are also preferred for lithium-ion-based actuators, since they provide very high lithium ion conductivities, elastomeric properties, and a wide redox stability window (4.5–5.5 V versus $Li^+/Li$). Preferred electrolytes for high temperature actuators include ionic glasses based on lithium ion conducting ceramics (superionic glasses) (up to 250° C.), ion exchanged β-alumina (up to 1,000° C.), $CaF_2$, and $ZrO_2/Y_2O_3$ (up to 2,000° C.). Other preferred inorganic solid-state electrolytes are AgI, AgBr, and $Ag_4RbI_5$. Preferred inorganic molten salt electrolytes for high temperature actuators include alkali metal halides (such as NaCl, KCl, and mixtures of these salts) and divalent metal halides (such as $PbCl_2$).

An electrolyte is considered to be a single electrolyte even when it is a mixture of different components that can separately serve as an electrolyte, as long as these components are substantially mixed. The actuator devices of preferred embodiments can use either one electrolyte of more than one electrolyte. For example, the electrolyte that penetrates a porous actuator electrode can be different than the electrolyte that separates electrodes in the actuator. Also, different electrolytes can be used as penetrating materials for different electrodes of the actuator. Employing more than one electrolyte can be used to optimize actuator operation. For instance, a particular electrolyte (or electrolytes) can be chosen for optimizing the double-layer formation, intraelectrode ionic conductivity, and mechanical properties of a particular electrode. It may be desirable to use a different electrolyte (or electrolytes) to penetrate other porous actuator electrodes, so that different levels of ionic conductivity, mechanical strength, and charge injection can be obtained for different actuator electrodes. Likewise, the electrolyte (or electrolytes) that separate electrodes can differ from those infiltrated in the porous electrodes. For example, a solid-state electrolyte might be used in a porous actuator electrode that serves in a unimorph electromechanical actuator (so that high electrode strength is obtained), while a liquid electrolyte can be used to surround this unimorph (so as to avoid constraints on the movements of the unimorph actuator). Likewise, as will be described later, an electrode that contains a patterned arrangement of penetrating solid-state electrolyte and non-ionically conducting materials (so as to provide a patterning of regions that provide an actuator response) can be operated in a surrounding liquid electrolyte. When more than one electrolyte is used, it is most preferred that at least one of these electrolytes is a solid or gel electrolyte. While the electrolyte that separates electrodes is preferably electronically insulating, the electrolyte that penetrates an individual electrode can have a significant degree of electronic conductivity.

In order for the actuators of the preferred embodiments to operate, the two required electrodes of the actuator (working and counter-electrodes) must be contacted with an electrolyte. Incomplete contact of these electrodes with the electrolyte will generally degrade actuator performance. This means that porous electrode materials should be filled with electrolyte in order to provide attractive actuator performance. Furthermore, it is desirable to minimize the separation between the working and counter electrodes in order to optimize performance. Most preferably this minimization is accomplished by including the working electrode, electrolyte, and counter electrodes as interpenetrating elements in a single composite structure.

The following is an example of how such a composite structure can be formed for carbon nanotube electrodes. A 1 micron to 100 micron thick sheet of carbon nanotubes could be formed by a self assembly process, like described in Example 1. Permanent electrical contact can be made with this nanotube sheet, prior to the deposition of a nanometer or thicker coating of an electrolyte on the nanotubes. This coating process is halted after the nanotubes are individually coated by electrolyte and before the electrolyte fills the pore volume of the nanotube sheet. The electrolyte-coated nanotube sheet array is then infiltrated with more nanotubes (or an alternative counter-electrode material, such as a conducting polymer) and then the structure is filled with additional electrolyte (either a solid-state electrolyte or a liquid electrolyte). Addition of an electrical contact with this latter deposition of nanotubes and application of a voltage between this electrical contact and the electrical contact to the originally deposited nanotubes provides for device operation.

In the preferred embodiments, the actuators may be used for the conversion of electrical energy to mechanical energy. The applications for these mechanical actuators are diverse and include, for example, robotic devices; high temperature air flow valves for aircraft engines; optical switches, such as for optical displays or optical fiber interconnects; phased-array antennas; adjustable structures for vibration suppression and failure avoidance; phase shifters for optical gyroscopes; precision electronic gyroscopes; artificial muscles for space suits; and smart microactuators for controlling the hydrodynamics of surfaces. This utilized actuator process is fundamentally different from previously known magnetostrictive, electrostrictive, ferroelectric, electrostatic, shape-memory, and faradaic electrochemical processes. Unlike faradaic electrochemical actuators, the non-faradaic actuators of the preferred embodiments do not require dopant intercalation and de-intercalation during the actuator cycle, so they do not suffer from cycle life and cycle rate limitations from such partially irreversible processes.

The conventional conducting polymer actuators that have so far been demonstrated are based on the intercalation (and de-intercalation) of ordinary organic conducting polymers, which cannot be used at temperatures much higher than 200° C. (because of chemical degradation). Also, the ferroelectric materials of conventional actuators cannot be used effectively above the Curie transition temperature, which is typically below 300° C. The actuators of the preferred embodiments comprise forms of carbon that are stable to far above 1000° C. Consequently, the actuators of the preferred embodiments may be used as high temperature actuators, which are needed for many applications and were previously unavailable. Additionally, the mechanical actuators of the preferred embodiments can provide (a) high stress generation capabilities, (b) high gravimetric and volumetric work capabilities per cycle, and (c) high volumetric and gravimetric power generation capabilities. Also, the actuators of the preferred embodiments can operate at low voltages, which provides savings in device electronics, avoids potential safety hazards, and minimizes electromagnetic interference effects.

The non-faradaic electromechanical actuators use a charge-induced change in length of a conjugated polymer chain, a fiber or fiber array, or a graphite sheet or graphite sheet array. For polymers such as polyacetylene, poly(p-phenylene), or poly(p-phenylene vinylene), electron donation to the neutral polymer causes a chain length expansion. Also, in many cases electron donation by the neutral polymer can cause a chain length contraction. Such reversal of dimensional change with the sign of charge transfer (with respect to the neutral state) also occurs for the in-plane dimension of graphite. Since donor and acceptor processes can provide oppositely directed dimensional changes, a cantilever bimorph actuator can be based on non-faradaic charging of identical anode and cathode polymers. The opposite sign of dimensional changes obtained for electron injection and removal from the zero charge state indicates that the quantum chemical effects provide an actuator response that is strong enough to overwhelm ordinary electrostatic effects.

Because of the difficulty in combining high surface area with useful mechanical properties, carbon single-wall nanotubes are most preferred for electromechanical actuators for converting electrical energy to mechanical energy. These carbon single-wall nanotubes are most preferably in the form of sheets for the electromechanical actuators. Most preferably for the electromechanical actuators, the nanotube direction is predominately in the plane of the sheet.

Extensional electromechanical actuators utilize either linear or biaxial dimension changes of a redox material to accomplish mechanical work. The ability to do mechanical work is proportional to the material's elastic stiffness and the strain-charge coefficient, $dL/Ldy$, which is the derivative of strain with respect to dopant concentration y. The dimensional changes used for the actuator can either be those of the individual electrode elements or the relative changes in dimensions of two or more of these elements, as in a cantilever configuration. Various device configurations can be utilized. Cantilever-based electromechanical actuators provide one preferred configuration. Such devices utilize changes in relative length to cause an actuator displacement. In bimorph devices, such as described in Examples 2, 3, 6, and 10, the actuator displacement is caused by the relative displacement of two electrode sheets (which are preferably in the form of strips) that both undergo dimensional changes. In unimorph actuators, such as described in Example 5, the actuator response is a result of the dimensional change of a single electrode—which is operating against the constraint of a material having essentially static dimensions to provide a displacement.

The non-faradaic actuators of the preferred embodiments can also be used to make hydraulic actuators that utilize the total volume change of the electrolyte and actuator electrodes to provide the actuator displacement. This actuator displacement can result from the use of the volume change to push a hydraulic cylinder. Such hydraulic actuators are preferably based on either actuators in which both actuator electrodes function predominately non-faradaically or actuators where one electrode functions predominately non-faradaically and a second electrode functions predominately faradaically.

Carbon nanotube sheets are especially preferred for both bimorph and unimorph electromechanical actuators devices. The use of carbon nanotube sheets for an actuator would seem unrealistic because it would be expected that the nanotubes would bundle together so extensively that electrolyte penetration into the sheets, which is required for device operation, would not occur. However, although bundling can occur (like the packing of cylinders), this bundling is not so extensive as to prohibit useful device operation, as described with respect to Example 1. Also, this bundling can be dramatically decreased by the slow electrochemical cycling over wide potential ranges during a break-in treatment for the actuator. Results obtained for unimorph and bimorph electromechanical actuators made from sheets of carbon single-wall nanotubes are described in the examples and in FIGS. 3–6.

Figure 3:
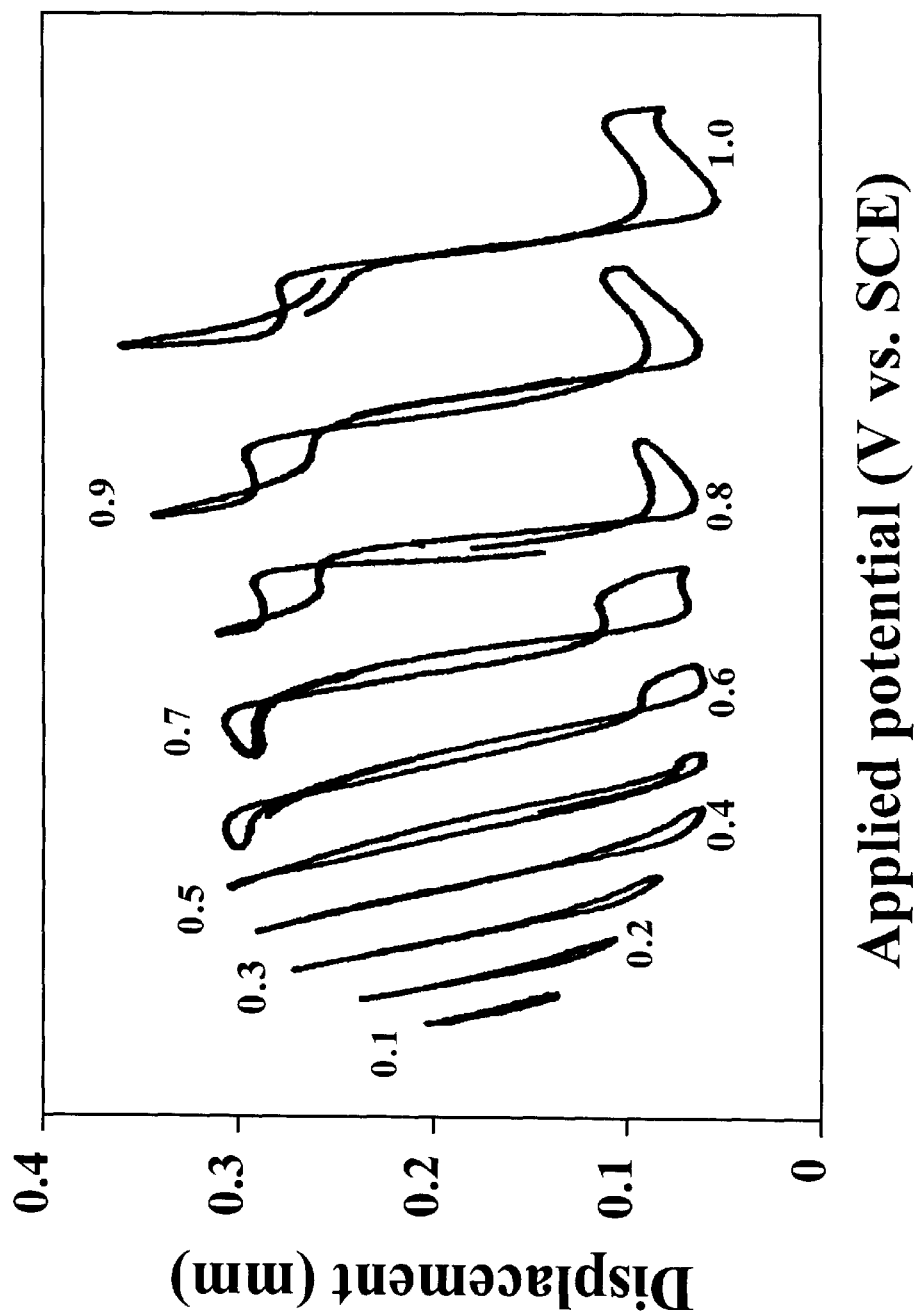
FIG. 3 is a graph showing measured cantilever displacement versus electrode potential for a cantilever bimorph electromechanical actuator.

FIG. 3 shows measured cantilever displacement (arbitrary origin) versus electrode potential (in 1 M NaCl) for a cantilever bimorph in which two 15 $\mu$m thick, single-wall nanotube sheets bend a 215 $\mu$m thick film of poly(vinyl chloride). The values illustrated in FIG. 3 are taken from Example 6, which will be described subsequently. The potential range was symmetric about 0 volts (versus saturated calomel electrode, SCE) and the scan rate was 50 mV/s. The labels on the curves indicate the maximum applied potential.

Figure 4:
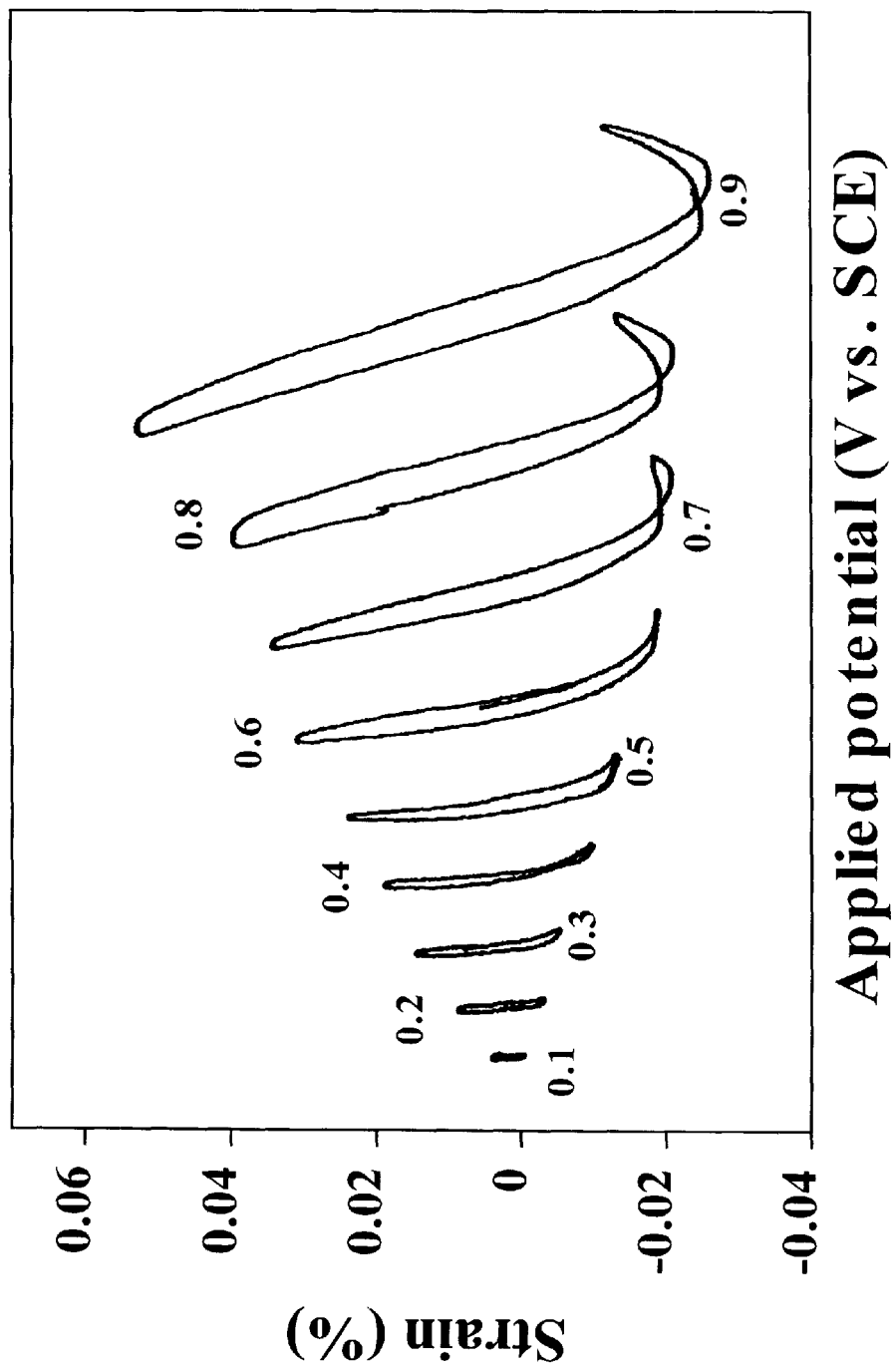
FIG. 4 is a graph showing the electromechanical actuator strain of a carbon single-wall nanotube sheet electrode versus applied potential.

FIG. 4 shows the strain (arbitrary origin) of a carbon single-wall nanotube sheet versus applied potential. This actuator characteristic was measured by using the length changes of a nanotube sheet electrode to bend a cantilevered beam. The values illustrated in FIG. 4 are taken from Example 7, which will be described subsequently. Electrode potentials are versus SCE for a 1 M aqueous NaCl electrolyte. The potential range was symmetric about 0 volts (versus SCE) and the scan rate was 100 mV/s. The labels on the curves indicate the maximum applied potential.

Figure 5:
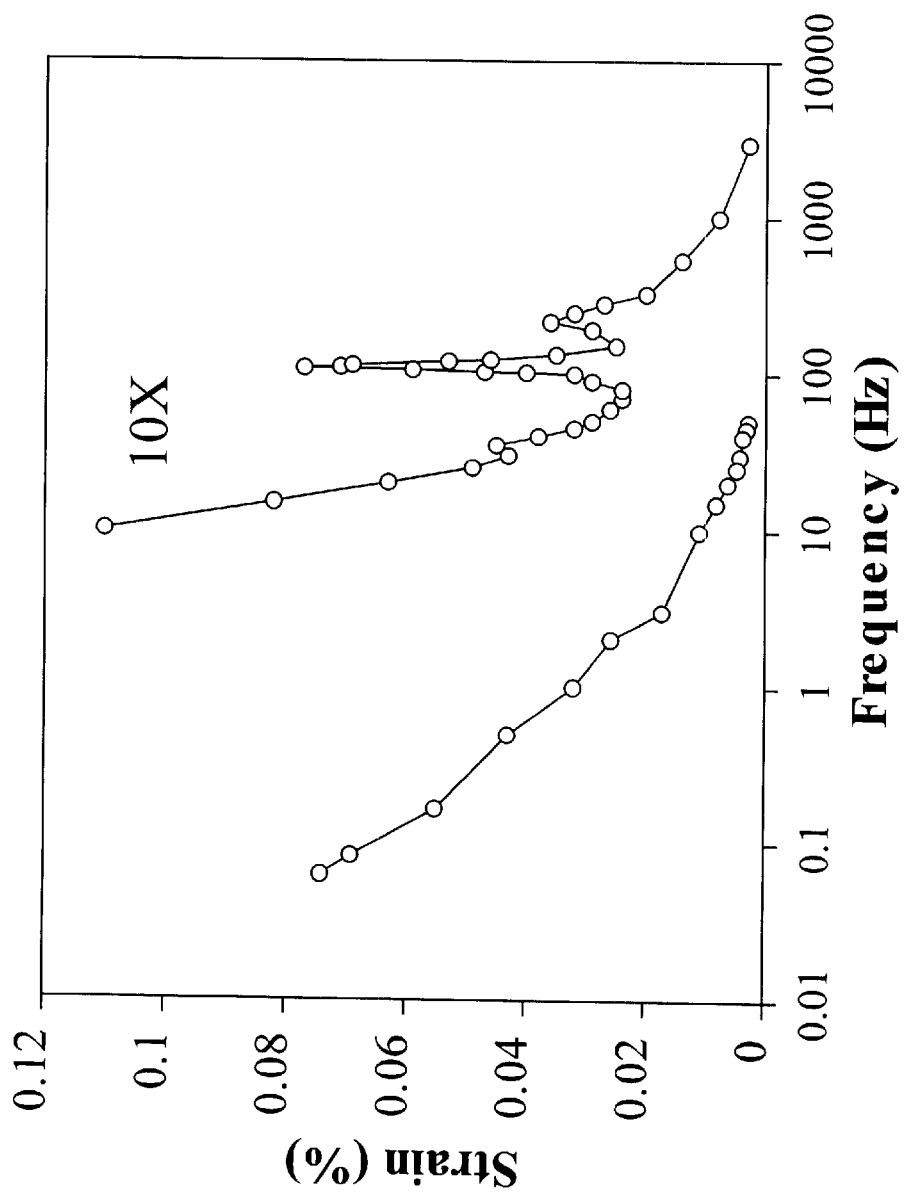
FIG. 5 is a graph showing the frequency dependence of electromechanical actuator strain in a carbon single-wall nanotube sheet electrode for an applied square wave potential of ±0.5V.

FIG. 5 shows the frequency dependence of strain in a carbon single-wall nanotube sheet electrode for an applied square wave potential of ±0.5 V. The values illustrated in FIG. 5 are taken from Example 9, which will be described subsequently. This actuator characteristic was measured by using the length changes of a nanotube sheet electrode to bend a cantilevered beam. The electrode potentials are versus SCE for a 1 M aqueous NaCl electrolyte. FIG. 5 shows the frequency dependence of strain at higher frequencies (where the strain scale is amplified ten-fold) and indicates resonances arising from the cantilever beam measurement system.

Figure 6:
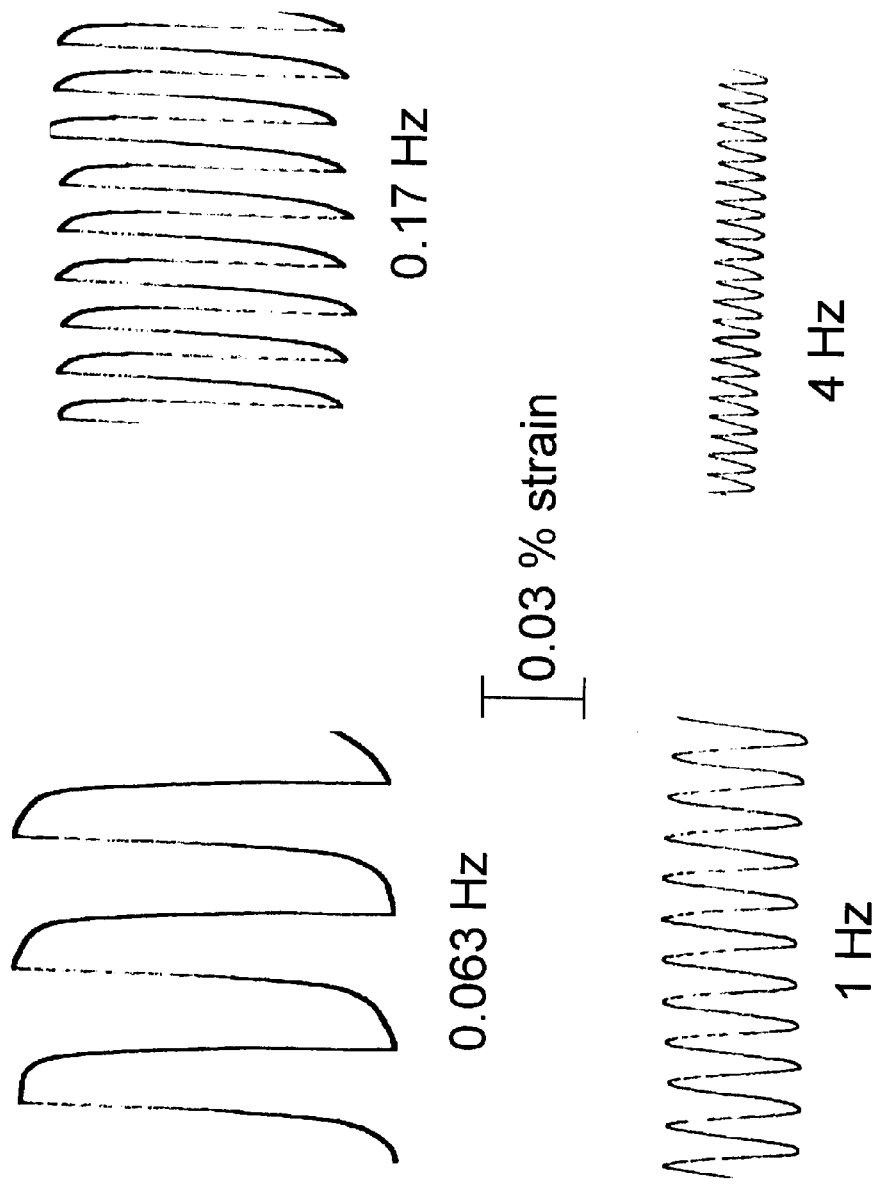
FIG. 6 shows the time dependence of electromechanical actuator strain in a carbon single-wall nanotube sheet electrode for an applied square wave potential of ±0.5 V for the indicated frequencies.

FIG. 6 shows the time dependence of the strain in a carbon single-wall nanotube sheet for an applied square wave potential of ±0.5 V having the indicated frequencies. This actuator characteristic, taken from Example 9, was measured by using the length changes of a nanotube sheet electrode to bend a cantilevered beam. Electrode potentials are versus SCE for a 1 M aqueous NaCl electrolyte.

As examples of useful devices, a bimorph electromechanical actuator can consist of two strips of carbon nanotube sheets that are sandwiched on opposite sides of an electrolyte filled porous separator, and adhesively connected to this separator. Such a device can be conveniently constructed by using the porous separator as a filter for liquid dispersed nanotubes to obtain the nanotube sheet on one separator side, then turning the porous separator over and repeating the process. An electrochemical potential applied between the opposite sides of the porous separator in a liquid electrolyte will cause the nanotube sheet on one side to expand, and the nanotube sheet on the opposite side to contract (or undergo a smaller expansion), thereby providing a cantilever-type actuator deflection. This porous separator and liquid electrolyte can be replaced with a solid-state electrolyte, thereby providing a non-faradaic nanotube-based actuator that will work in air.

The simplest unimorph actuator of a preferred embodiment consists of an electrolyte-filled actuator electrode strip (such as a strip on nanotube paper) that is laminated with a strip of an inert material (such as a metal or plastic foil) whose dimensions are not directly effected by the electrochemical processes. The actuator response (a bending) results from the effect of the relative change in dimensions of the actuator material and the electrochemically inert material. This inert material in the unimorph actuator is preferably a metal or metal alloy, since the metallic conductivity of the metal or metal alloy can reduce the time constant of the device. In such device, the counter electrode can be separate from the actuator electrode, as long as an ionically conducting path separates the actuator electrode and the counter electrode. Most preferably, both electrodes are part of mechanically separated unimorph actuators.

A unimorph actuator of another preferred embodiment comprises a porous actuator element that is a single sheet of high surface area material that is electronically conducting (such as a carbon nanotube sheet) and penetrated on opposite sides by materials having different ionic conductivities. For example, the highly ionically conducting material can be any of the solid-state or liquid electrolytes described in this application, and the less ionically conducting (or ionically insulating) penetration material can be an elemental metal or metal alloy, an insulating plastic, or a less ionically conducting solid-state or gel electrolyte. The actuator operation results from the application of a voltage between this sheet and a counter-electrode. If one electrolyte uniformly penetrates the entire sheet, the actuator response of this electrode would be a uniform dimensional change. However, if opposite sides of the actuator electrode are penetrated by materials having different ionic conductivities, a unimorph type of device results.

In the simplest case of such device, the actuator sheet is penetrated on one side by an electrolyte having high ionic conductivity and the other side of the actuator sheet is penetrated by an ionically insulating material that can be either electronically conducting or insulating. The double layer formation can form only on the side of the sheet that is infiltrated by the ionically conducting material, so only this side of the actuator sheet can undergo an electrically stimulated dimensional change. Hence, the cantilever type bending required for a unimorph operation is obtained.

Alternatively, the opposite sides of the above unimorph actuator can be infiltrated by electrolytes having different ionic conductivities, so that the direction of actuator response moves first in one direction and then in the opposite direction when a voltage is applied between this actuator electrode and a counter electrode. Increasing the applied potential then causes a repeat of this two-step actuator process. Reversing the applied potential can cause a similar response, but with the direction of the two-step process reversed. An advantage of using a single sheet of electronically conducting, high-surface-area actuator material for a unimorph (and introducing asymmetry by the infiltration of different materials into opposite sides of these sheets, at least one of which must be ionically conducting) is that device response rate can be enhanced (by conductivity along both sides of the unimorph) and problems of interlayer delamination can be avoided.

Another particularly preferred type of unimorph actuator is one in which a carbon sheet is laminated with a glass or ceramic fiber sheet. The reason for this preference is that the high thermal stability of the glass fiber or ceramic fiber sheet complements the high thermal stability of the carbon nanotube sheets, thereby enabling actuator operation at high temperatures.

In another type of actuator configuration, the actuator response is in the form of either a propagating wave or a standing wave that accomplishes mechanical work. The device configurations for electrochemical actuators can be easily understood by reference to those arrangements that have been exploited for piezoelectric and electrostrictive materials. A comprehensive description of these device arrangements is provided in *Piezoelectric Actuators and Motors* by K. Uchino (Kluwer Academic Publishers, Boston, 1997) and in *The Applications of Ferroelectric Polymers*, edited by T. T. Wang, J. M. Herbert, and A. M. Glass (Chapman and Hall, New York, 1988).

Some of the above actuator types require different degrees of actuation for different parts of a ferroelectric actuator element. The issue of how to cause actuation for one part of a conducting electrode, while causing no actuation (or a different degree of actuation) for a different part of the electrode is more complicated than for the ferroelectrics. For the ferroelectrics, different actuation in different parts of the actuator sheet is conveniently achieved by applying a separate electrode pair (and for some areas no electrode) to these different parts. This result cannot be achieved analogously for a porous conducting actuator electrode due to the conductivity of this electrode. The way around this problem is to apply either an electrolyte and/or a non-ionically conducting material in a patterned manner in the porous conducting actuator electrode. For example, a porous electrode dipped in an electrolyte containing a counter electrode will show actuation only in those regions of the electrode where the electrolyte is able to contact to form a double-layer. Other regions that are coated in a patterned manner with a non-ionically-conducting material will show no actuation. Likewise, a patterned deposition of solid-state electrolyte on a porous conducting electrode will result in actuation only in those regions where this electrolyte exists and is contacted through an ionically conducting path to a counter electrode. Correspondingly to these needs for the non-faradaic actuators, an actuator comprising a non-faradaic actuator electrode that has a patterned deposition of either a solid material that is not an electrolyte or a patterned deposition of a material that is an electrolyte, wherein this electrolyte deposition is contacted through an ionically conducting path with at least one counter electrode, provides a preferred embodiment.

Figure 7:
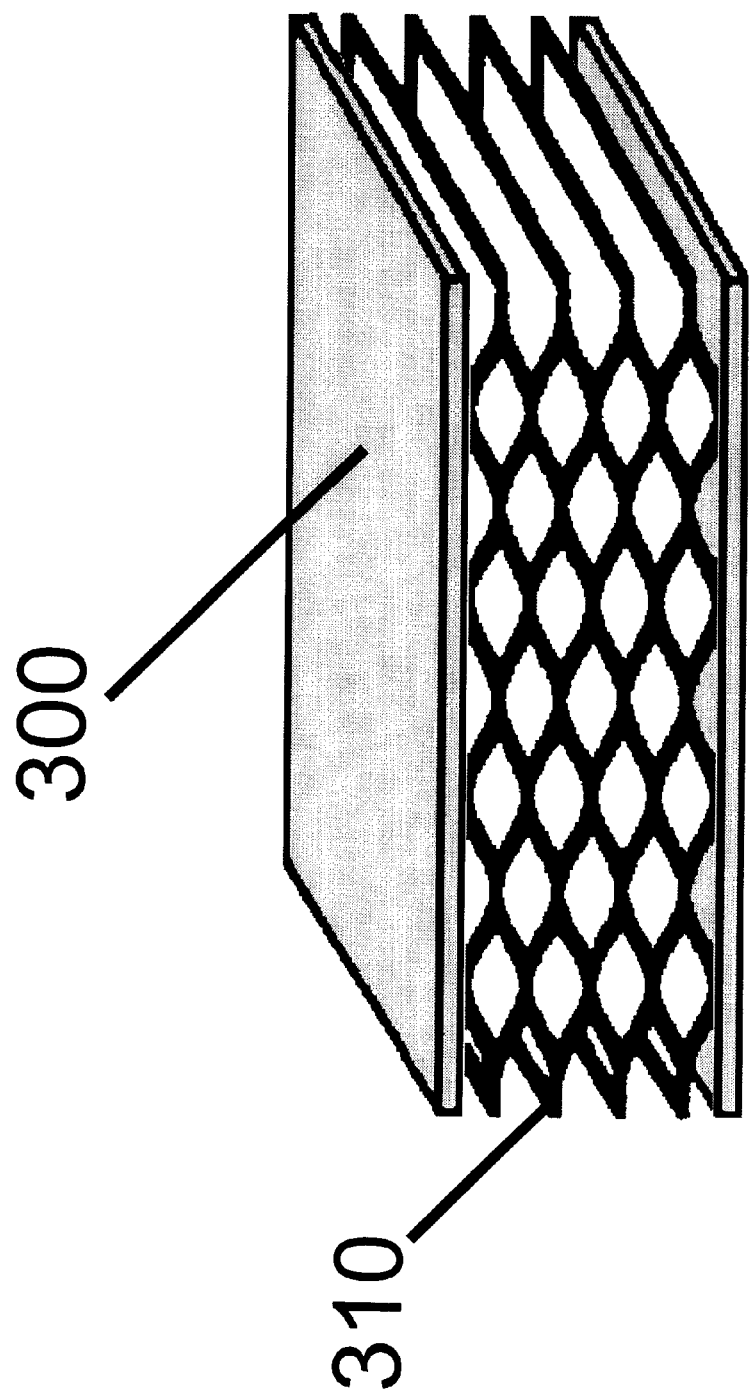
FIG. 7 illustrates an accordion-like (cantilevered) electromechanical actuator arrangement.
Figure 8:
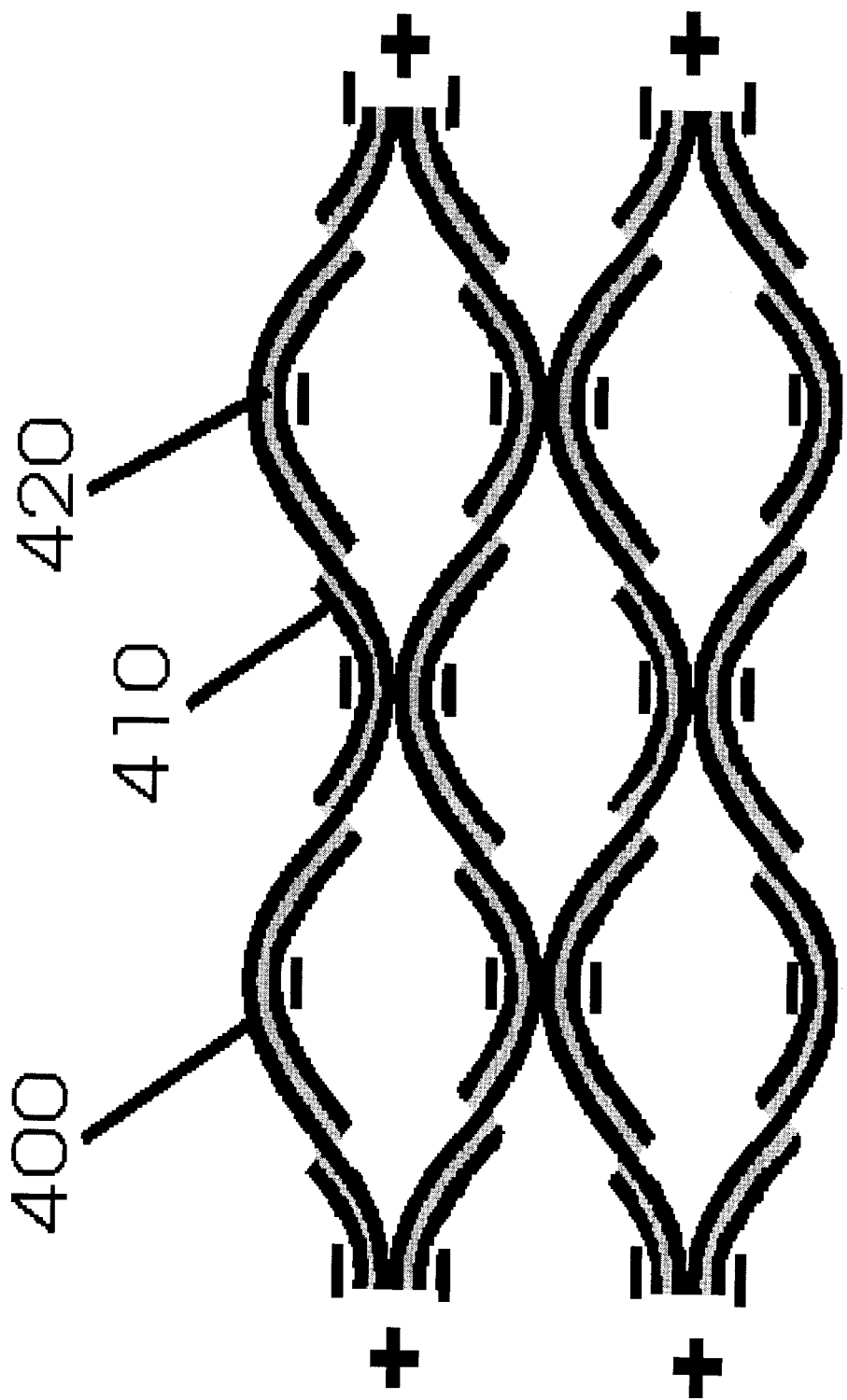
FIG. 8 illustrates a cross-sectional design for an accordion-like electromechanical actuator.
Figure 9:
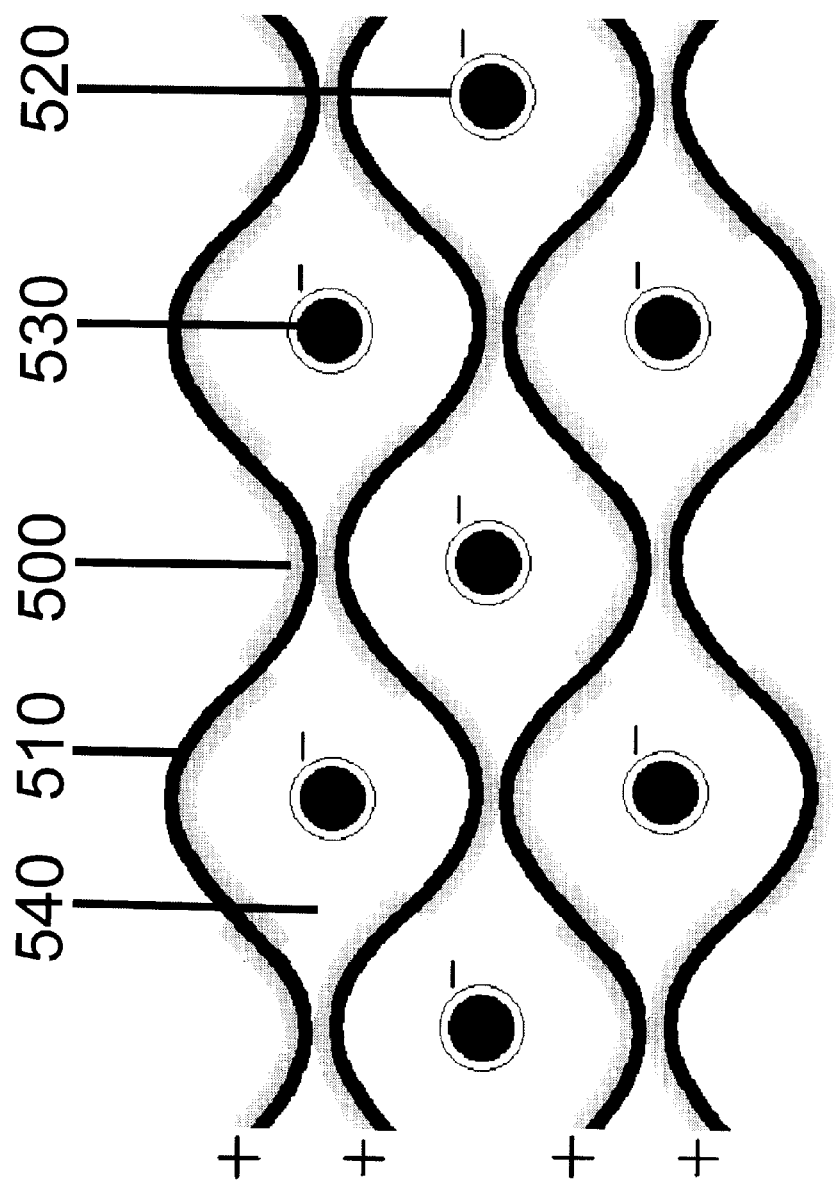
FIG. 9 illustrates another cross-sectional design for an accordion-like electromechanical actuator.
Figure 10:
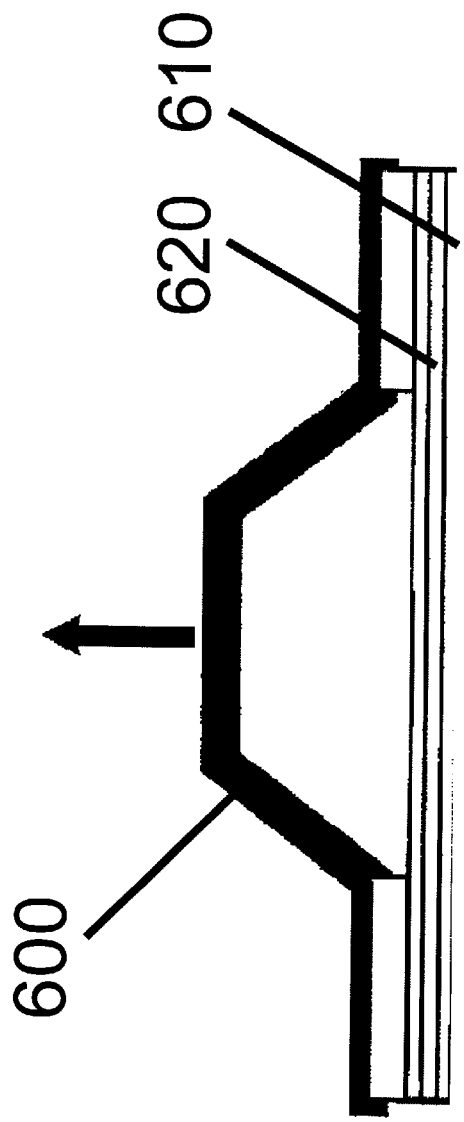
FIG. 10 schematically illustrates a cymbal-type electromechanical actuator.

The nanotube sheet compositions can be configured as an array of cantilevered bimorphs or unimorphs (as illustrated in FIGS. 7–9) and as multi-layer extensional actuators in a cymbal mechanical amplifier, as illustrated in FIG. 10. Mechanical actuators that comprise a plurality of interconnected cantilevers are preferred. As an alternative to the use of cantilevered arrangements to amplify displacement, the cymbal arrangement of FIG. 10 is useful, especially when a larger force generation capability is required. Also, nanotube actuator sheets can be used as sound projectors and as a "smart hydrodynamic surface" that consists of a randomly deposited array of nanotube actuators that are electrically addressed in parallel.

FIG. 7 illustrates an accordion-like electromechanical actuator arrangement that is suitable for applications where high displacement instead of high force generation is desired. This type of actuator can be viewed as an assembly of cantilevered actuators. Possible electrode arrangements for the accordion-like assembly are illustrated in FIGS. 8 and 9. A rigid surface 300 of any general rigid material may be adhesively mounted to the accordion-like assembly and may be used for the transfer of actuator strain. The assembly of cantilevered actuators, which is illustrated in greater detail in FIGS. 8 and 9, is denoted as 310.

FIG. 8 illustrates one design for the accordion-like assembly of the actuator shown in FIG. 7. This design is based on an assembly of bimorph actuators. A cross-sectional view along the sheet direction is shown. Working electrodes 400 are in the form of a strip. Counter electrodes 410 are in the form of a sheet strip that provide a mechanical deformation that is out-of-phase with that of the working electrodes 400. For example, electrodes 400 and 410 can be sheets of carbon nanotubes. Solid-state electrolyte sheet strips are denoted as 420 and can be phosphoric acid reacted nylon 6 and various other electrolytes, as described previously. Electrolyte, which can be part of the electrolyte sheet 420, fills the voids of working electrode 400 and the counter electrode 410. Electrical lead wires may be clipped or bonded to exposed edges or sides of the working and counter electrodes 400 and 410. An electrically generated contraction of working electrodes 400, and simultaneous electrically generated expansion of counter electrodes 410, results in a contraction of the actuator in the vertical direction.

FIG. 9 is a schematic representation of an alternative design for the accordion-like assembly of the actuator type shown in FIG. 7. This design is based on an assembly of unimorph actuators. Like the device in FIG. 8, the device in FIG. 9 can serve as part of a pump for an ionically conducting liquid, such as salt water. Sheet strips 500 are a material that is electrically insulating and electrochemically inactive, such as an ordinary organic polymer like polyvinyl chloride. Actuator electrode sheets are denoted as 510, which may be carbon nanotube sheets, for example. Cylindrical electrolyte-permeable layers 520 cover rod-like counter-electrodes 530. Cylindrical electrolyte permeable layers 520 may be any material that is not electronically conductive (i.e. prevents flow of electrons), but that is ionically conductive (i.e. does not stop the flow of ions from the electrolyte). For example, the electrolyte permeable layers may be paper with appropriately sized holes. Electrolyte permeable layer 520 may be an open pore polymer foam and counter-electrode 530 can be a porous carbon electrode. The ionically conducting liquid, such as saltwater or seawater, is denoted as 540. An electrically generated contraction of actuation electrode sheets 510 cause the actuator to contract in the vertical direction, thereby partially expelling the ionically conducting liquid 540, which serves as an electrolyte. In this actuator design, counter electrodes 530 perform no useful mechanical work.

FIG. 10 schematically illustrates a cymbal-type actuator arrangement for amplifying actuator displacement. Cymbal-based stress amplifier 600 is driven by the simultaneous expansion (and contraction) of working electrode and counter electrode sheets 610 that alternate in the sheet stacking direction and are separated by solid-state electrolyte sheets 620. The arrows represent the actuator expansion that results when the working and counter electrode sheets are electrically caused to contract. For example, sheets 610 may be sheets of carbon nanotubes and solid-state electrolyte 620 may be hydrated phosphoric acid/polyvinyl alcohol.

It is preferable that charge injection at the working and counter electrodes of an electromechanical actuator contributes additively to the overall mechanical response of the device. This is the case for a cantilevered device in which the dimensional change of the working electrode works to enhance the actuator displacement caused by the counter electrode. Such result occurs if these electrodes operate out-of-phase, meaning that an expansion of the working electrode occurs at the same time as a contraction of the counter electrode. This is not the case for simple extensional actuators where the actuator strain is identical to electrode strains. This type of electromechanical device is optimized if the displacements of working and counter electrodes occur in-phase. Both in-phase and out-of-phase operation can generally be obtained for the electrode materials of the preferred embodiments. The reason is that these electrodes either expand or contract with increasing hole injection depending upon the potential of the electrode versus a reference electrode. This means that either in-phase or out-of-phase electrode displacements can be obtained by properly adjusting the voltage range of device operation and the relative amounts of working electrode material and counter-electrode material. The point is that one can decrease the charge concentration of a working electrode that is required to match the overall charge level of the counter electrode by increasing the relative weight of the working electrode. Hence, since the sign of electrode-dimensional-change versus voltage-change generally depends on the concentration of the injected charge, either in-phase or out-of-phase behavior can be conveniently obtained. This ability to vary the relative charge concentrations in opposite electrodes by varying their relative weights is also important as actuator response can be enhanced by using either in-phase or out-of-phase changes in surface energy, color, refractive index, electrical conductivity, dielectric constant, reflectivity, or absorption.

In a further preferred embodiment, the actuator device may comprise more that two current carrying electrodes that can be operated at different voltages. The advantages of using more than two current carrying electrodes is that additional flexibility is achieved with respect to the degree of charge injection in the individual electrodes, which is useful for optimizing actuator performance.

Nano-scale actuators can be constructed that are based on a monolayer graphite sheet. In order to eliminate complications associated with electrically addressing a single graphite sheet, the graphite actuator can be connected with a large-area conducting substrate that provides one electrical contact. The second contact can be to the liquid electrolyte (containing the second electrode) that covers the substrate and actuator. The actuator construction can start with either a large area, multi-layer piece of highly oriented pyrolytic graphite (HOPG) or a single layer of graphite that is formed by known methods [see H. Itoh, T. Ichinose, C. Oshima, and T. Ichinokawa, Surface Science Letters 254, L437 (1991) and T. A. Land et al., Surface Science 264, 261 (1992)] (such as by graphitizing a layer of ethylene on a clean surface of Pt or TiC).

Consider first the case where the starting material is a monolayer of graphite obtained by the pyrolysis of a layer of ethylene. This monolayer is on a large-area conducting substrate, which contains ledges between adjacent planar areas. These ledges can be undercut by chemically etching, as is commonly done in micromachining (so as to produce sections of the graphite monolayer that extend into free space). Prior to this etching step, the single graphite sheet can optionally be cut into finger-like strips (so as to make small actuators) using either conventional lithographic methods or the known method [see R. L. McCarley, S. A. Hendricks, and A. J. Bard, J. Phys. Chem. 96, 10089 (1992)] of atomic probe graphite-monolayer etching (which has been used to produce 10 nm lines and 25×25 nm graphite squares).

In order to construct a bimorph actuator, the upper surface of this graphite must be coated with a material (called the opposition layer) that opposes the dimensional change of the graphite during double-layer charging. This coating process is probably best accomplished prior to the undercutting etch step that is used for partially freeing the graphite monolayer from the substrate. Since the deposited opposition layer should have close to the same area-adjusted in-plane modulus as the graphite layer, this opposition layer can be quite thick if it is composed of a low modulus organic material. Consequently, such opposition layer could be conveniently obtained by various routes (such as polymerization from the vapor phase or by the polymerization of an organic monolayer film that is deposited by Langmuir-Blodgett methods).

While these nanoscale actuators are applicable for specialty uses, macroactuators and microactuators presently have the greatest practical importance. The preferred method for using graphite sheets for such larger scale electromechanical actuator devices is to employ actuator electrodes that consist of substantially exfoliated graphite sheets in a solid polymeric electrolyte. In order to obtain high performance from such graphite sheet/electrolyte composites, the concentration of the exfoliated (or partially exfoliated) graphite should be sufficiently high that these graphite sheets form a percolated structure. Such percolation is required in order to obtain the high electrical conductivities that are desired for the actuator electrodes.

As is the case for piezoelectric actuators, the mechanical actuators of the preferred embodiments can be used to electronically dampen mechanical vibrations and stiffen structures. Such applications of piezoelectrics are described, for example, by R. Forward in Applied Optics 18, 690 (1979). The method that is preferred for dampening mechanical vibrations is to provide an actuator displacement that opposes the mechanical vibration that is to be dampened. This is conveniently accomplished by using a strain sensor output from the vibrating mechanical structure to control the actuator. Likewise, an actuator displacement can be used to stiffen a structure by the effective addition of the actuator element in mechanical series with the structural element that requires stiffening.

The mechanical actuators of the present invention can be run in reverse to convert mechanical energy to electrical energy for mechanical sensor and energy conversion devices. For cases in which the working and counter electrodes are identical, the generation of electrical energy requires that mechanical stress be applied differently to these electrodes. Most preferably, a tensile stress is applied to one electrode while a compressive stress is applied to the other electrode.

The reason that a high performance actuator can also be used for converting mechanical energy to electrical energy is described as follows. The electromechanical coupling factor (traditionally called $k^2$) is both equal to (stored mechanical energy)/(input electrical energy) and (stored electrical energy)/(input mechanical energy). Hence, a high value of $k^2$ implies a high obtainable mechanical power density for a high specific capacitance material and high obtainable electrical energy generation density for a material with a high achievable mechanical energy density (before mechanical failure). While ferroelectrics generate low current at high voltages, the non-faradaic actuator of the preferred embodiments can provide high currents at low voltages. This is desirable for minimizing the effect of lead capacitances for remotely located sensors, so that sensor-response amplifiers need not be located down-hole when doing seismology for oil exploration. The ability to operate the actuators at low frequencies for electrical energy generation from mechanical energy is usefully exploited for the conversion of mechanical energy of ocean waves to electrical energy. Actuators based on sheets of nanotubes (separated by preferably a solid electrolyte, a gel electrolyte, or a porous membrane filled with salt water) are preferred. An array of such sheet actuators is preferably electrically joined in series to provide an additive output voltage.

In one preferred embodiment, the electrolyte used for non-faradaic conversion of mechanical energy to electrical energy is one that causes charge injection when no potential is applied, such as a concentrated acid like concentrated sulfuric acid. Although such charge injection under zero applied voltage can be predominately faradaic, the operation of the actuator device is preferably operated predominately non-faradaically by using stress cycles that are too short for the faradaic charge transfer. Consequently, it is preferably the case that the weight change of the electrodes during the process of energy generation is less that 5%.

In another preferred embodiment, the actuator electrodes are electrically biased during device operation using an applied voltage. The advantage of such biasing is that the electrical energy generated by mechanical stress can be increased. However, when using such biasing, the stress generated voltage changes should preferably be electrically isolated from the biasing voltage. Preferably, this is accomplished by using a capacitor in series with the bias circuit.

The actuators used to convert mechanical energy to electrical energy preferably utilize either a uniaxial, biaxial, or hydrostatic applied stress. Device polarity is preferably achieved using different materials for opposing electrodes, an applied bias voltage, or the application of differing stresses to the opposing electrodes.

The same charge injection process that results in changes in material dimension for electromechanical actuators can result in changes in electrode electrical conductivity, electrode absorption and reflectivity (including electrode color), electrode thermopower, electrode thermal conductivity, electrode surface energy, and electrode dielectric constant. Each of these charge-injection induced electrode charges can be used in the preferred embodiments. Small band gap semiconductors and rather poor metals (like forms of carbon, conducting polymers, and rather poorly conducting semiconductors, doped semiconductors, and metal oxides and metal sulfides) are preferably used for actuators that use a charge-injection-induced change of electrode conductivity, electrode absorption and reflectivity (including electrode color), electrode thermopower, electrode thermal conductivity, electrode surface energy, and electrode dielectric constant. The reason is that highly conducting metals have such high carrier concentrations that the injected charge has little influence on these properties. On the other hand, elemental metals having high electrical conductivities (as well as all of the above compositions) are suitable for actuator applications that use charge injection (and associated charges in the electrolyte double layer) to produce a change in electrode surface energy and electrode dimensional change.

Like the case of electromechanical actuators, the predominant use of double-layer charge compensation (in contrast with intercalation-based charge compensation) provides a major difference between the actuators of the preferred embodiments and the conventional intercalation-based actuators for optical displays, electrically switchable windows, surface energy switching, and the control of fluid flow or permeation. Consequently, similar device configurations can be used for the actuators of the preferred embodiments as for the conventional actuators. However, in contrast with the case for the conventional actuators, the actuator electrode in accordance with the preferred embodiments preferably comprises a porous solid with skeletal density in gm/cm$^3$ of $\rho$ that (a) undergoes an actuator response upon non-faradaic charge injection, (b) has a gravimetric surface area of at least about 150 $\rho^{-1}$ m$^2$/gm and a capacitance of at least about 5 $\rho^{-1}$ F/gm, and (c) contains within the pores an electrolyte that is ionically conducting and electronically insulating.

For example, an electrically switchable window for the control of solar energy transmission can be constructed by depositing a sheet of high-surface-area conductor (such as nanofibers of a conjugated conducting polymer) on opposite sides of an electrolyte sheet and adhesively connecting this three layer assembly on the inside of a dual-pane window used for housing purposes. Both of these electrodes can optionally be connected to a conductor layer (typically a transparent metal oxide) in order to facilitate current collection. For the opposite electrodes, non-faradaic charge injection either fills or empties electronic states, thereby generally resulting in the bleaching or shift of portions of the optical absorption spectra. A corresponding arrangement can be used for a flat panel display that uses non-faradaic charge injection for providing individual pixels that charge color or color intensity. Alternatively, each of the pixels of an optical display can be the site of a cantilever-type electromechanical actuator of the preferred embodiments. These microactuators can provide the display response by either reflecting or absorbing light to an extent dependent upon the displacement of the electromechanical actuator.

The actuators based on high-surface-area materials can be used as optical switches, such as for display devices and directional light sources. Such switches can use the changes in optical properties resulting from non-faradaic charge transfer, which can include changes in optical Bragg scattering for periodic structures and changes in absorption, refractive index, and reflectivity.

Figure 11:
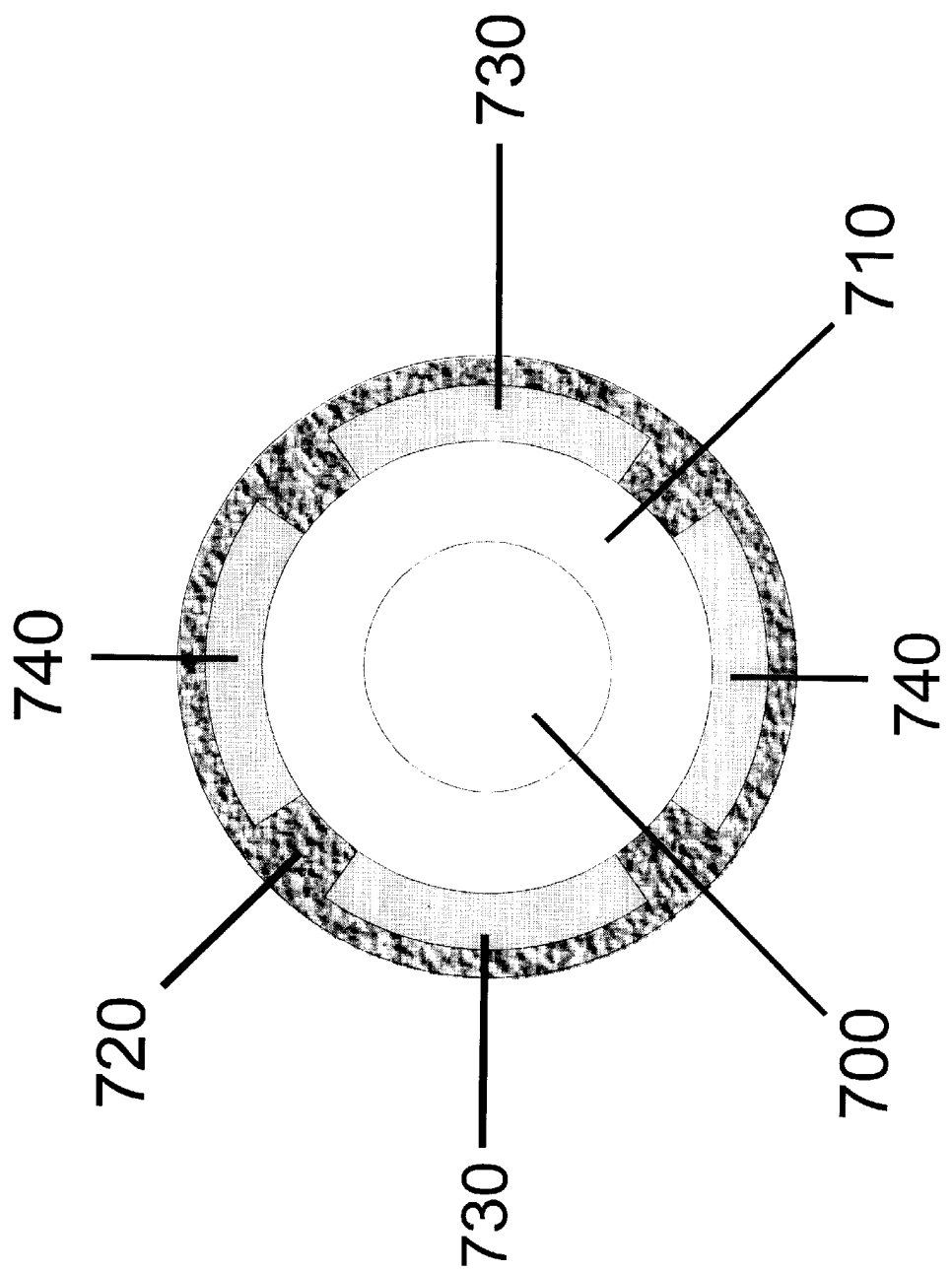
FIG. 11 schematically illustrates an actuator arrangement for driving the deflection of an optical fiber for an optical fiber switch.

An example of the use of mechanical actuators of the preferred embodiments for an optical switch application is illustrated in FIG. 11. As illustrated, a clad optical fiber can be switched between neighboring optical fibers by using a mechanical actuator that is part of the optical fiber structure. More specifically, a clad optical fiber can be coated on different quadrants with strip-like assemblies of carbon nanofibers that serve as separate electrodes. This assembly of nanotube fibers is preferably deposited from a mixture of nanotubes and electrolyte polymer contained in a volatized liquid. The entire assembly can then be overcoated with a thin coating of a solid-state electrolyte, which preferably penetrates the assembly of nanofibers if the assembly of nanotube fibers is not otherwise electrolyte filled. Application of voltages between pairs of these electrodes causes a cantilever-based bending of the optical fiber. This bending displacement brings the optical fiber from a mating position with one neighboring optical fiber to a mating position with a second neighboring optical fiber. As an alternative to using nanotube fibers in conjunction with only a solid-state electrolyte, other preferred embodiments for mechanical optical switches use a nanotube assembly that is immersed in a liquid electrolyte. For such application modes, it is preferable that the ionic electrolyte is one having a refractive index that approximately equals that of the optical fiber core at an optical wavelength used for the operation of the optical fiber switch, so that a reduction in transmitted light intensity (due to refractive index effects) can be minimized. In such case, the nanofiber assembly is preferably substantially filled with either a solid-state electrolyte or a liquid electrolyte. The number of actuator strips that is used to control the movement of the optical fiber is preferably either one, two, three, or four. Since these different actuator strips are preferably operated as electrodes at different voltages, the result is the ability to move the optical fiber in one or more directions.

FIG. 11 schematically illustrates an actuator arrangement that drives the deflection of an optical fiber 700 having cladding 710. The view is down the length of the optical fiber. Actuator electrodes 730 are for deflection in the horizontal direction and actuator electrodes 740 are for deflection in the vertical direction. Actuator electrodes 730 and 740 are semi-cylindrical strips that are extended orthogonal to the figure plane. Actuator electrodes 730 and 740 may be deposits of carbon nanotubes that are infiltrated by electrolyte 720. Mechanically soft solid-state electrolyte layer 720 (such as phosphoric acid reacted nylon 6) overcoats electrodes 730 and 740 and the clad optical fiber. Application of a potential between top and bottom electrodes 740 causes a fiber deflection in the vertical direction. Application of a potential between side electrodes 730 causes a fiber deflection in the lateral direction.

The mechanical actuators of the preferred embodiments can also be used to switch the operation of optical Bragg filter elements by applying a mechanical stress or strain to these elements. This stress or strain changes the frequencies at which the Bragg filter reflects and transmits optical wavelengths, thereby facilitating multiplexing for optical telecommunication applications. These optical frequencies are preferably at either infrared or visible wavelengths.

As another type of actuator application, the non-faradaic charge injection in a sheet of high-surface-area, high capacitance material (such as a sheet of single-wall nanotubes) causes a surface energy change that is lowest at the potential of zero charge injection, and increases nearly parabolically with deviations from this potential. If two such sheets are electrodes that are on opposite walls of a narrow fluid flow path, the rate of flow of an ionically conducting fluid (such as salt water) can be controlled using an applied interelectrode potential. Various other configurations are useful for such a fluid flow control actuator, such a high-surface-area, cylindrical actuator electrode for a cylindrical pipe, where the counter electrode can be a wire in the pipe interior (if the fluid is an ionically conducting fluid), or a second cylindrically shaped electrode that is exterior to the above actuator electrode, and separated from this actuator electrode by a solid electrolyte.

Actuators for a heat pump utilize the switching of thermoelectric coefficient as a result of double-layer-induced charge injection in a thermoelectric material (such as bismuth or an alloy of bismuth and tellurium). As for other actuator embodiments, the gravimetric surface area and gravimetric capacitance of this thermoelectric should be very large, preferably above 150 $\rho^{-1}$ m²/gm and 5 $\rho^{-1}$ F/gm, respectively, where $\rho^{-1}$ is the material density in gm/cm³. The thermoelectric power (S) of this thermoelectric, which is an electrode in the thermoelectric device, can be expressed as $S=(S_{h}\sigma_{h}+S_{e}\sigma_{e})/(\sigma_{h}+\sigma_{e})$, where $S_h$ and $S_e$ are the thermopower for holes and electrons, respectively, and $\sigma_h$ and $\sigma_e$ are the electrical conductivities due to holes and electrons, respectively. Injection of electrons in the thermoelectric increases $\sigma_e$, thereby increasing the electron contribution to thermopower. On the other hand, injection of holes increases $\sigma_h$, thereby increasing the hole contribution to thermopower. The overall thermopower is normally reduced by the partial cancellation of the hole and electron contributions to thermopower (since $S_h$ is positive and $S_e$ is negative). Consequently, electron injection in a thermoelectric with a negative thermopower (or hole injection in a material with positive thermopower) will increase thermopower. The opposite legs of a thermoelectric heat pump actuator (where current is passed in opposite directions) are most preferably materials that have an opposite sign of thermopower. A thermoelectric heat pump actuator having this most preferred characteristic is illustrated in FIG. 12.

Figure 12:
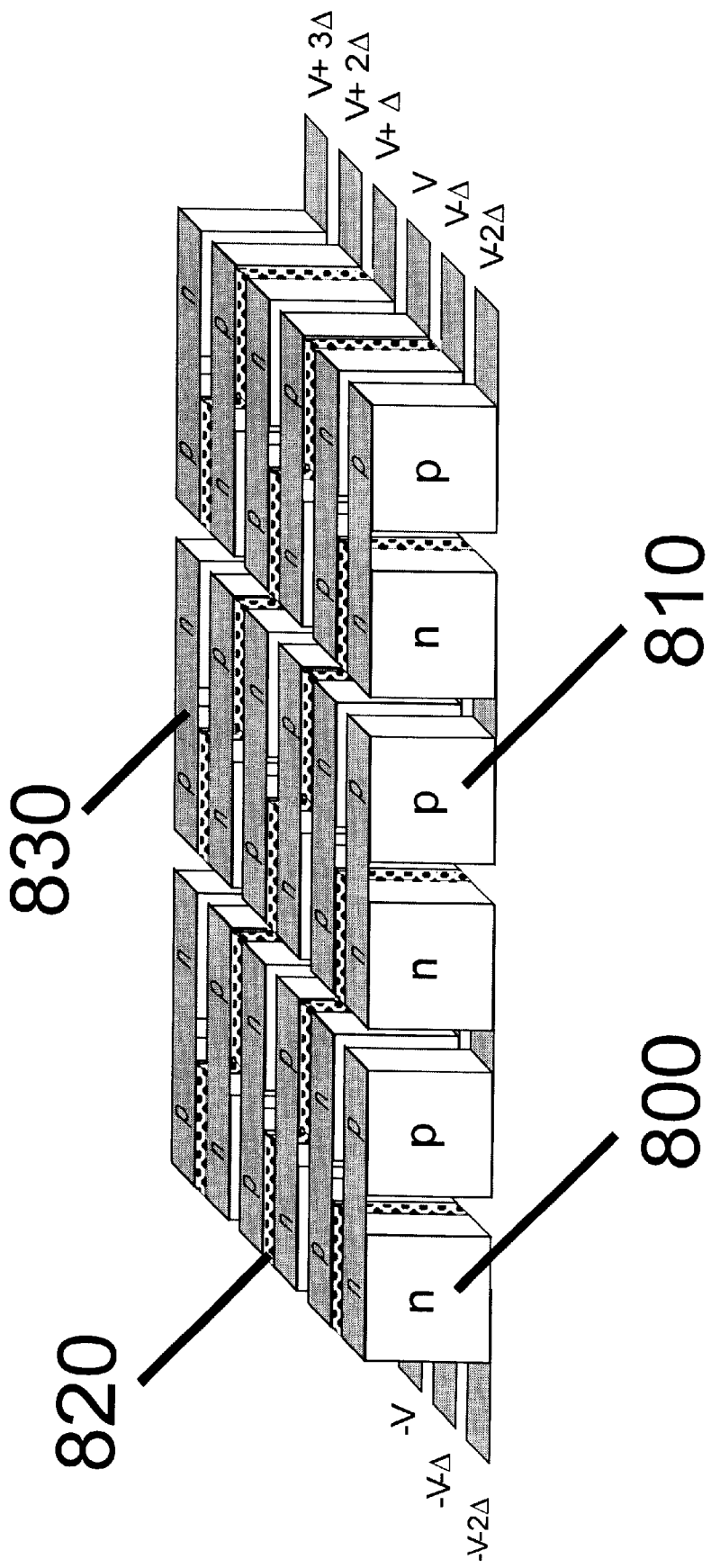
FIG. 12 illustrates a heat pump actuator.

FIG. 12 illustrates a heat pump actuator comprising n-type thermoelectric elements 800 and p-type thermoelectric elements 810 that are electrically separated by a layer of solid-state electrolyte 820 and that are electrically connected by metallic connectors 830. Thermoelectric elements 800 and 810 may be, for example, n-type and p-type bismuth telluride alloy compositions, respectively. Voltages are applied at the terminals on the left and right sides of the actuator across n, p element pairs to drive thermoelectric pumping. In general, the heat pump actuator works to move hot electrons from the reservoir being cooled to a second reservoir (which are located at the bottom and top of the assembly of n, p element pairs, respectively). This results from the influence of an electric field that is formed by the potential difference $[(-V-2\Delta)-(V-2\Delta)]$ applied across the first array of n, p element pairs, for example. In view of the specifically applied voltages, a potential $\Delta$ exists across electrolyte 820 between neighboring n-type element 800 and p-type element 810, for example. Potential $\Delta$ therefore drives the actuator effect, causing increased hole injection into the p-type elements, and increased electron injection into n-type elements, thus enhancing the thermoelectric effect. Potential $\Delta$ may be selected to either enhance or reduce thermoelectric pumping.

An actuator that provides the switching of thermoelectric power in a heat pump actuator can be conveniently constructed by using the high-surface-area bismuth wire mesh as a thermoelectrically active electrode. One method for the fabrication of this high-surface-area mesh electrode is described in a commonly owned pending patent application Ser. No. 09/170,826 of Zakhidov et al. This method comprises self-assembling $SiO_2$ spheres as an opal type lattice. These spheres preferably have a sphere diameter of from about 10 nm to about 300 nm, and are preferably nearly monodispersed in sphere diameter. The spheres are preferably sintered by thermal annealing to provide a intersphere spacing that is smaller than the sphere diameter. This sintering process enables the extraction of the silica spheres after the infiltration of bismuth under high pressure, and the subsequent solidification of this bismuth in the void space of the opal. This extraction process is then conveniently accomplished by immersion of the bismuth-infiltrated silica structure into aqueous hydrofluoric acid solution, so that the silica spheres are dissolved. A plate electrode comprising a high-surface-area wire mesh of bismuth results from this easily conducted process if the original silica opal is plate shaped, or if the infiltrated opal is cut into a plate shape after the infiltration process.

Electromechanical actuators of the preferred embodiments can also be thermal switches that use electromechanical displacements to interrupt thermal diffusion pathways. For example, an array of cantilever actuators comprising high-surface-area electrodes separated by a solid-state electrolyte can nearly completely cover a surface that requires cooling. In the "on" position, the cantilever devices could be partially deflected so as to thermally contact a closely located parallel surface that provides the cooling power. In the opposite actuator position (the "off" position), the actuators return to the flat position—thereby breaking thermal contact. There is a major need for such electrically controlled thermal switches for improving the effective efficiencies of thermoelectric devices. The effect of a current pulse in a thermoelectric cooler is to remove heat from the surface to be cooled and transfer it to a heat sink. This process occurs at electronic time scales during passage of the electrical current through the thermoelectric. However, the cooling effect is partially reversed by the resistive heating in the thermoelectric—which has the effect of heating the object to be cooled. If the electromechanical actuator array provides the necessary thermal contact during the passage of the current through the thermoelectric device, and breaks this contact during the time that it takes for the resistive heating thermal pulse to propagate through the thermoelectric, cooling efficiencies can be improved.

Actuators of the preferred embodiments can be used for the control of the electromagnetic wave propagation for ultraviolet, visible, infrared, radio frequency, and microwave frequency regions. Such control can utilize actuator caused modulation of electrical conductivity, refractive index, dielectric constant, absorption, and reflectivity—which result from electrochemical double-layer charge injection. A principal application is as actuator elements for active filtering, attenuation, phase shifting, and inter-line coupling for electronic transmission lines (such as microstrip line, strip line and co-planar wave guides). Actuators of the preferred embodiments may also be used with photonic crystal arrays involving metallic and semiconducting elements to provide actuator switching of photonic crystal properties. Static arrays of this type are known in the art for the microwave and radio frequency regions.

Although semiconducting single-wall carbon nanotubes are not especially preferred for application as electromechanical actuators because of associated problems in device response rate, they are especially preferred for the construction of an optical switch for varying transmission, emission, and reflectivity at infrared wavelengths. Such optical switch can comprise two electrolyte-filled sheets of semiconducting carbon nanotubes (or mixtures of these nanotubes with metallic nanotubes) that are separated by an electrolyte layer. Non-faradaic charging of these semiconducting nanotubes makes these semiconducting nanotubes more highly conducting, thereby changing the transmission, emission, and reflectivity at infrared wavelengths. The preferred semiconducting carbon nanotubes for the infrared optical switch application are chiral and zigzag carbon single-wall nanotubes.

Efforts have been made to achieve active control by the coupling of ferroelectric elements to transmission lines, and switching the transmission characteristics by electrically switching the dielectric constant of the ferroelectric. The actuators of the preferred embodiments provide an attractive alternative method of transmission line switching by the electronic control of the coupling between dielectric elements and the transmission line. In the preferred embodiments, switching results from the change in the electrical conductivity of a semiconducting or semi-metallic electrode by double-layer charge injection. Semiconducting carbon single-wall nanotubes are especially preferred for this application.

The actuator devices of the preferred embodiments can be conveniently controlled by regulating the voltage between two electrodes in the actuator (working and counterelectrodes), the current or integrated current that flows between these electrodes, the voltage of a working electrode with respect to a reference electrode (i.e., an electrode that conducts negligible current), or a combination of these processes. Also, the actuator process (such as an actuator caused property change or displacement) can be used in a feedback loop to control the actuator so as to optimize performance. Since optical property changes (such as changes in optical transmission or reflection) can occur as a result of charge injection in an actuator electrode, the use of an optical property to control the actuator output provides a preferred method.

The optimal choice of operating voltage profiles (versus time) for electrically powered actuators is based on the following considerations. For actuators that need effectively unlimited life and very high cycle rate, it is preferable to choose electrolyte composition, actuator surface area, the degree of structural orientation, and the applied voltage-time profiles that result in largely non-faradaic charge injection. On the other hand, if slower response times and shorter cycle life are permissible in order to obtain larger actuator response, these conditions can be modified so that both non-faradaic and faradaic charging contribute to actuator response. Second, driving voltages that are much higher than equilibrium potentials are required to optimize power density, while energy efficiency and cycle life optimization require applied potentials that are closer to the equilibrium potentials. Third, the use of deep charge and discharge cycles (i.e., large changes in the dopant concentration for a faradaic component of actuator response) generally increases the maximum actuator response, but decreases the cycle life.

Figure 13:
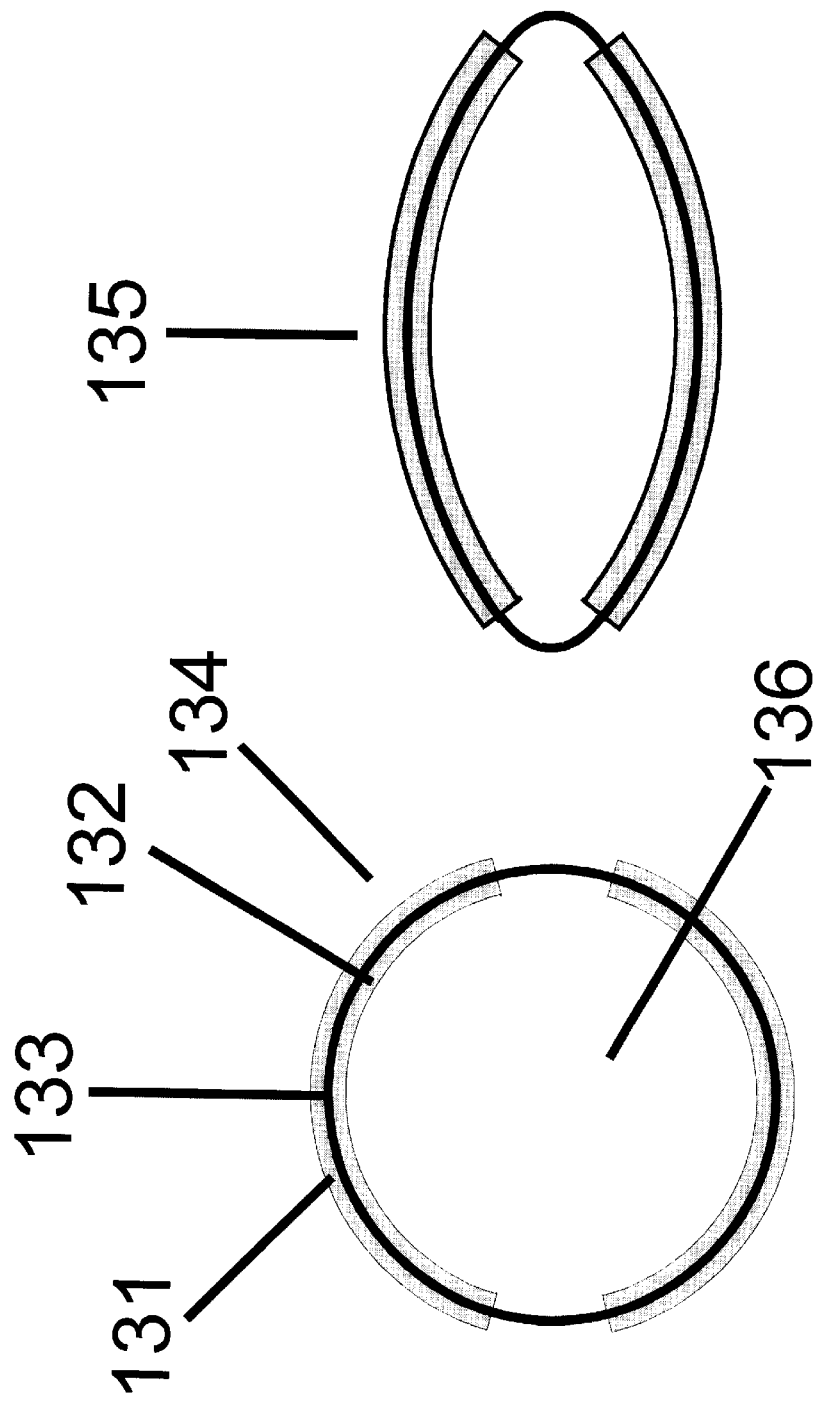
FIGS. 13A and 13B illustrate a fuel-based actuator in fully extended and contracted states, respectively.
Figure 14:
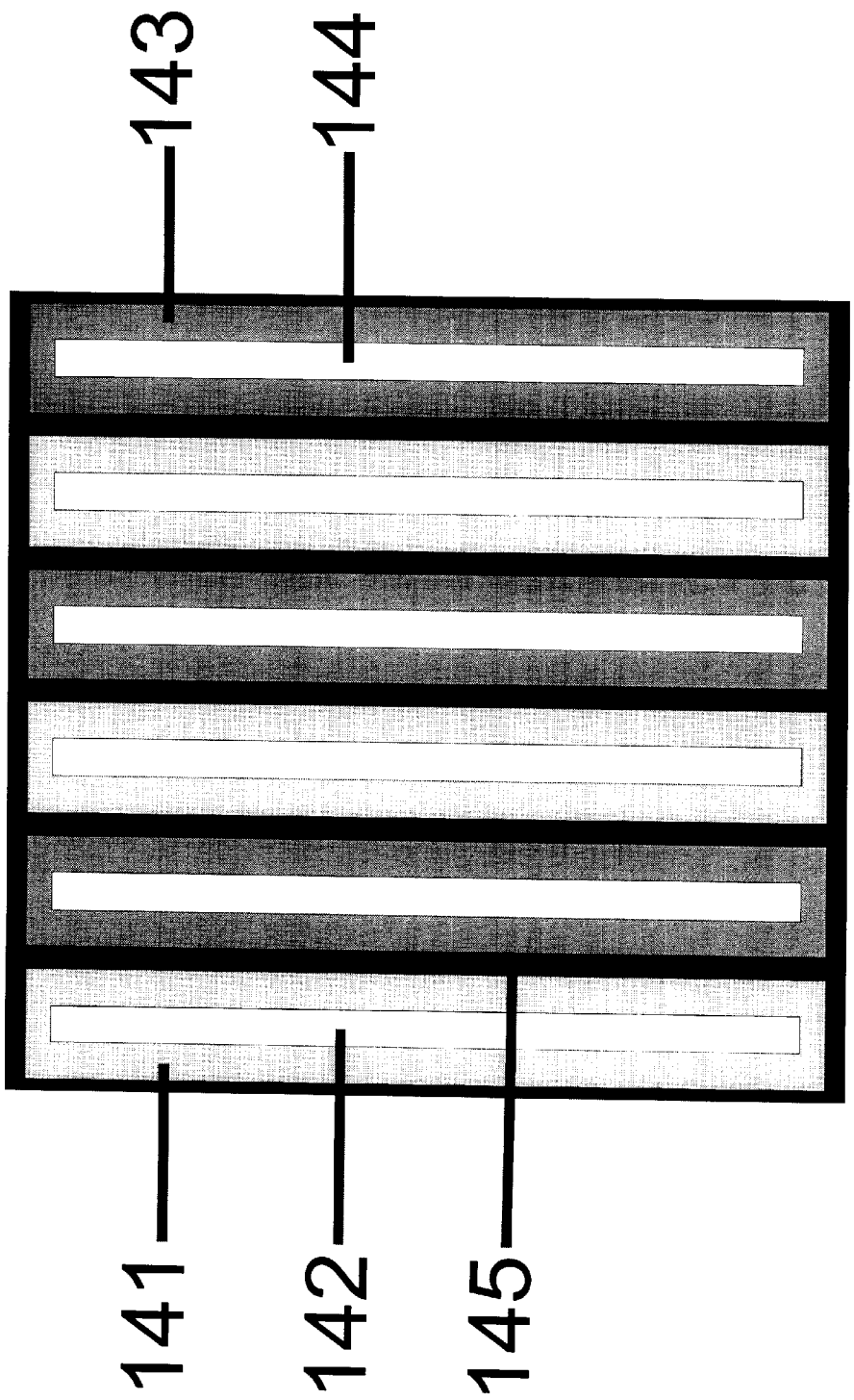
FIG. 14 illustrates a cross-sectional view of a fuel-based actuator having a stack of alternately placed hollow working electrodes and hollow counter electrodes.

As an alternative to providing electrical energy to the actuator, this energy can be internally generated either by using one or more of the actuator electrodes as either a fuel cell electrode (as illustrated in FIGS. 13A, 13B, and 14), a battery electrode, or a photo-cell electrode. As a first example, both the actuation electrode and the counter electrode can also be electrodes in a fuel cell that is powered by a fluid A at one electrode and a fluid B at the opposite electrode. Fluid A is most preferably in gaseous form and is most preferably either hydrogen; a hydrocarbon such as $CH_4$, $C_2H_6$, or $C_3H_8$ at preferably 100–200° C.; an alcohol such as methanol or $C_2H_4(OH)_2$ at preferably 20–80° C.; $H_2S$ at preferably 20–90° C.; a nitrogen derivative such as $NH_2NH_2$ at preferably 20–60° C.; or ammonia at preferably 200–400° C. Fluid B is preferably oxygen gas. Both fuel cell electrodes are preferably porous. More preferably both electrodes are porous, have a gravimetric surface area of at least 150 $\rho^{-1}$ $m^2$/gm and a capacitance of at least 5 $\rho^{-1}$ F/gm (where $\rho$ is the skeletal density of the porous electrode in gm/$cm^3$), and contain an electrolyte within the electrode pores.

Also, both actuator electrodes in these chemically powered actuators preferably contain catalyst particles for increasing the rate of the fuel cell reaction (oxidation and reduction). These catalysts are preferably contained in an electrode surface region where the gaseous reactant, the electrolyte, and an electrode element make three-way contact. Preferred catalysts are Pt, Ru, Pt/Ru, and iron(III) tetrmethoxyphenylporphyrin. Since this actuator type is a fuel cell, such actuators can use the various electrolytes and separator materials that have been developed for the various types of fuel cells. Perfluorosulfonate polymer is a preferred electrolyte. As a second example, the actuator electrodes can also be electrodes in a battery—thereby providing the energy source to operate the actuator. For instance, one electrode can be aluminum or zinc (as in an Al/air or a zinc/air battery) and the second actuator electrode can be an air or oxygen exposed carbon nanotube sheet.

FIGS. 13A, 13B and 14 illustrate two preferred configurations for fuel-cell-powered actuators. As pictured in FIG. 14, a preferred configuration comprises working and counter electrodes that are hollow. Passage of the reactant gas (or gases) through these hollow regions (which can have any percolated geometry for the gas filled void space, such as plate shaped, cylindrical shaped, or a pore network) facilitates the charging process. In other preferred chemically powered actuators, one actuator electrode is comprised of lithium, the actuation electrode of the actuator is comprised of carbon nanofibers, and the electrolyte is comprised of a lithium salt and either thionyl chloride ($SOCl_2$) or $SO_2$, like in conventional batteries. In all of these chemically powered actuator devices the open-circuit actuator device is placed in charged state as long as the fuel cell or battery chemicals are available to undergo redox processes. In the fuel cell devices that operate using gaseous reactants A and B, interrupting the availability of one of these reactants and simultaneously connecting the anode and cathode electrodes causes switching from the charged to the discharged actuator states. Alternately, switching between oppositely charged electrode states can be obtained by switching the flow of the gaseous reactants A and B between the working and counter electrodes.

FIGS. 13A and 13B illustrate axial direction views of a fuel-based actuator in fully extended form (134) and contracted form (135), respectively. 10 When fully extended, as in FIG. 13A, this actuator is circular when viewed down the cylinder axis. The working electrode 131 is an oxygen conversion electrode that is surrounded by oxygen (or air). The counter electrode 132 is a hydrogen conversion electrode that is exposed to hydrogen that passes through the central cavity 136 of the actuator. For example, working and counter electrodes 131 and 132 may be comprised of carbon nanotubes. A gas-impermeable solid-state electrolyte 133 (such as perfluorosulfonate polymer) penetrates all but the outer surface region of working electrode 131 (where catalyst particles are located) and all but the inner surface region of counter electrode 132 (where catalyst particles are located). The ions corresponding to oxygen and the ions corresponding to hydrogen are formed at the working and counter electrodes 131 and 132, respectively, thereby causing electron transfer at these electrodes, which is compensated by ionic double-layer charge. As a result, a potential is generated across working and counter electrodes 131 and 132. A charging-induced expansion of counter electrode 132 and a contraction of working electrode 131 resulting from fuel cell operation cause the actuator 134 of FIG. 13A to partially collapse to form the actuator 135 of FIG. 13B. This deformation is reversed by electrically connecting together working electrode 131 and counter electrode 132, preferably simultaneous with interrupting the flow of hydrogen gas to the central region 136 of the actuator.

FIG. 14 shows a cross-sectional view of a fuel-based actuator that comprises an alternating stack of hollow working electrodes 141 and hollow counter electrodes 143 that are extended orthogonally to the plane of the figure. Oxygen gas passes through the hollow cores 142 of working electrodes 141 and hydrogen gas passes through the hollow cores 144 of counter electrodes 143. A gas-impermeable solid-state electrolyte 145 penetrates all but the interior regions of working and counter electrodes 141 and 143 (where catalyst particles are located). In contrast with the fuel-based actuator of FIG. 13, this device uses in-phase deformation of working electrodes 141 and counter electrodes 143 as a result of electrode charging. The process is reversed by electrically connecting together working and counter electrodes 141 and 143, preferably simultaneous with the interruption of the flow of hydrogen gas to the central cores 144 of counter electrodes 143. As typical examples, the working and counter electrodes 141 and 143 may be sheets of carbon nanotubes and the solid-state electrolyte can be a perfluorosulfonate polymer.

One especially preferred application of these chemically powered actuators is as displays, where the charge from one state of electrode charge injection to another state causes a change in the color or transparency of the electrode material. A second preferred application of these chemically powered actuators is as electromechanical actuators, where the change in injected charge in one or more electrodes causes an actuator displacement. The use of photo-rechargeable electrodes provides another alternative to the direct powering of the actuator devices using a power supply. In this case, the actuator reaches the charged state as a consequence of irradiation with light. The discharged actuator-state is then obtained by connecting together opposite electrodes of the actuator. An electrode comprising a transition metal chalcogenide is especially preferred. The preferred counter electrode, which is the preferred actuation electrode, is comprised of carbon nanotubes. The preferred electrolyte is an organic electrolyte such as acetonitrile containing a Li salt, such as $LiClO_4$.

The following examples are presented to more particularly illustrate the invention, and should not be construed as limiting the scope of the invention.

EXAMPLE 1

This example demonstrates the fabrication of sheets of single-wall carbon nanotubes by deposition from a suspension of carbon nanotubes in water. A nanotube suspension, which contains about 3.8 gm carbon nanotubes per liter (3.3 mg/ml) of aqueous suspension, was purchased from Tubes@Rice (Rice University, Houston, Tex.). These single-wall carbon nanotubes were prepared by the laser ablation method, and are known to predominately consist of (10, 10) nanotubes. Characterization of these materials by Raman spectroscopy and electron microscopy is consistent with previous investigations (J. Liu et al., Science 280, 1253 (1998); A. G. Rinzler et al., Appl. Phys. A 67, 29 (1998); and A. Thess et al., Science 273, 483 (1996)) showing a hexagonally packed bundle of carbon nanotubes having a nanotube diameter of about 12–14 Å, an intertube separation within a bundle of ~17 Å, an average bundle diameter of ~100 Å, and lengths of many microns.

The suspension (7.9 g) was diluted to 50 ml using deionized water and then sonicated for 30 minutes to further break aggregations of carbon nanotubes. The suspension was then further diluted to 800 ml, which resulted in a nanotube concentration in the aqueous solution of about 0.032 mg/ml. This suspension was filtered through a 47 mm diameter poly(tetrafluoroethylene) filter sheet (Millipore LS) under house vacuum. It took about 12 hours to complete the filtration, which resulted in the deposition of a sheet of nanotubes on the filter paper. After washing twice with two portions of 20 ml water and five times with five portions of 10 ml methanol, the nanotube deposition was dried in air for one hour and then further dried under vacuum at 60° C. for 12 hours.

This nanotube paper has a thickness of about 25 $\mu$m. Carbon nanotube papers having thicknesses of 50 and 100 $\mu$m were also prepared similarly by increasing the amount of carbon nanotube and degree of dilution by factors of 2 and 4, respectively. The nanotube papers so prepared using such concentrations, which are much lower than those of the conventional techniques, showed good mechanical properties. The 100 $\mu$m thick nanotube paper was especially strong.

The above process differs from the conventionally used process for nanotube sheet formation in that the nanotube suspension was highly diluted prior to nanotube sheet formation by filtration. The mechanical in-plane Young's modulus of the nanotube sheets was substantially increased as a result of high temperature thermal annealing, or high temperature annealing combined with a low temperature mechanical draw to obtain partial tube orientation. For example, the Young's modulus increased from about 1 GPa to about 5.5 GPa as a result of annealing at 1100° C. under flowing nitrogen gas and a mechanical draw step at below 450° C.

EXAMPLE 2

This example demonstrates the construction of carbon nanotube actuators from the carbon nanotube paper prepared in Example 1, and provides qualitative evaluation of the actuator properties. The actuator configuration was a bimorph. Two strips (~3 mm wide and ~20 mm long) of the single-wall carbon nanotube paper (which were cut by razor blade) were adhesively bonded to two opposite sides of a strip of double-sided Scotch™ Double Stick Tape. The Scotch™ Double Stick Tape was about 10% to 20% larger in lateral dimensions than the nanotube paper strips, so as to provide electrical insulation between the two nanotube paper strips. An insulating plastic clamp at the upper end of the three-layer strip supported the device vertically in 1M aqueous NaCl electrolyte, and held two platinum foil electrical leads in contact with the nanotube paper sheets paper (which are the two required electrodes in the actuator device).

Upon applying an AC potential having a peak-to-peak potential difference of over about 0.4 V, the cyclic displacement of the actuator tip was observed at the applied frequency—as the actuator pushed the electrolyte back and forth. The amplitude of displacement depended on the voltage. The higher the voltage, the larger the displacement. When the applied potential was higher than the electrolysis potential of the electrolyte, gas bubbles were observed. However, the actuator still operated under these conditions. The frequency of applied voltage at which the displacement becomes so small that it is no longer visible by the human eye depends on the nanotube paper thickness. For the 25 $\mu$m thick nanotube paper, the displacement is no longer visible when the frequency of the applied voltage is above 5 Hz. The actuator made from 50 $\mu$m thick nanotube paper still showed movement for applied voltage frequencies above 15 Hz. When the frequency was higher than the principal resonance frequency of the bimorph, the displacement becomes insignificant. When driving the actuator with a DC power source, a very large displacement was obtained. The tip displacement reached more than one centimeter within a few seconds for the actuator made from the 25 $\mu$m thick carbon nanotube paper.

EXAMPLE 3

This example demonstrates that the carbon nanotube actuators of Example 2 can work in various electrolytes. It also demonstrates that the operation of the actuator requires an ion-containing electrolyte, since this actuator does not operate in deionized water. The actuators were constructed as described in Example 2. A 5 M solution of NaOH in deionized water was evaluated as an alternative electrolyte. The actuator was driven in the same way as in Example 2. Similar actuation properties were observed for the 5 M aqueous NaOH electrolyte as for the 1 M NaCl aqueous electrolyte when the actuator was driven within the potential range which will not lead to electrochemical reactions. The actuators were also found to function well in a 1 M solution of HCl in deionized water. However, the bimorph device could not be operated as an actuator when immersed in pure deionized water. This shows that the actuation is electrochemical in nature.

EXAMPLE 4

This example shows the typical chemical potential range within which nanotube actuators can operate for different electrolytes without producing major faradaic chemical transformations in the electrolyte. Such faradaic electrochemical reactions generally shorten the lifetime of actuators because of the degradation of both the electrolyte and the actuator electrodes. All potentials under study in this example are given relative to SCE (saturated calomel electrode). The operational potential range was defined as the potential range within which no major faradaic reactions occur. This range was measured for an electrolyte cell in air by doing cyclic voltametry at a scan rate of 200 mV/s. The voltages at which major faradic processes occur was evident from major observed increases in current over a restricted voltage range. Both anode and cathode electrodes were carbon nanotube sheets. For 1 M HCl, 5 M KOH, and 1M NaCl in water, the potential ranges were found approximately between –0.3 V and +1 V, between –1.0 V and +0.5 V, and between –1.0 V and +1.0 V, respectively.

EXAMPLE 5

This example shows a more quantitative evaluation of the performance of the carbon nanotube actuators using a unimorph configuration in a 1M solution of NaCl in deionized water. The actuator consists of a nanotube sheet (3 mm×20 mm and 25 $\mu$m) that worked to bend an order of magnitude thicker (215 $\mu$m thickness) strip of poly(vinylchloride) film. This thick film (10% wider and 20% longer than the nanotube paper strips) was bonded on one side with a nanotube paper strip using an intermediary layer of Scotch™ Double Stick Tape. The lower end of the actuator (containing the nanotube paper strips) was mounted in the bottom of the electrolyte bath using a platinum clamp that provided both electrical contacts and mechanical support. The poly(vinylchloride) strip from the actuator core extended above the electrolyte, and supported a sputtered gold mirror on one strip face. The movement of this mirror as a result of the actuator tip displacement was measured as a function of electrode potential using a "Fotonic" sensor from MTI Instruments. The counter electrode was a platinum mesh.

The results indicate that the actuator response is approximately linear with applied voltage between −0.4 V and 0.1 V (with negligible hysteresis). However, at higher voltages (versus SCE) both hysteric behavior and a non-linear voltage dependence of displacement were observed.

EXAMPLE 6

In order to obtain more quantitative results, a bimorph cantilever actuator was made in which two nanotube sheets having the above strip dimensions worked to bend an order of magnitude thicker (215 $\mu$m thickness) strip of poly (vinylchloride) film. This thick film (10% wider and 20% longer than the nanotube paper strips) was connected on opposite strip sides with the nanotube paper strips using an intermediary layer of Scotch™ Double Stick Tape. This thick plastic film provides both mechanical support for the actuator as well as electrical insulation between two pieces of the carbon nanotube paper. The lower end of the actuator (containing the nanotube paper strips) was mounted in the bottom of the electrolyte bath (1 M NaCl) using a clamp that provided electrical contacts. The poly(vinylchloride) strip from the actuator core extended above the electrolyte, and supported a sputtered gold mirror on one strip face. The movement of this mirror as a result of actuator tip displacement was measured as a function of electrode potential using a "Fotonic" sensor from MTI Instruments. The results (shown in FIG. 3) indicate that the actuator response is approximately linear with applied voltage (versus SCE) between −0.4 V and 0.1 V (with negligible hysteresis). However, both hysteric behavior and a non-linear voltage dependence of displacement occur at higher voltages. To examine the actuator response speed, this actuator was driven using a function generator. In this case the voltage referred to is the inter-electrode voltage, and not the voltage of an electrode with respect to SCE. A sinusoidal waveform was used with a peak-to-peak potential difference of about 2 V. This actuator was found to have a resonance peak at ~25 Hz. Above this resonance frequency, the actuator provided only a very small displacement.

EXAMPLE 7

Since the response of the above bimorph cantilever actuators depends on the difference in the electrically induced expansion of opposite actuator electrodes, characterization of these devices does not directly provide the electromechanical response of the nanotube paper. For this purpose, the present example provides measurements of the change in length of a nanotube sheet as a function of potential (versus SCE) in 1M NaCl. This nanotube sheet was made by the method described in Example 1. One end of a vertical nanotube paper strip was anchored to the bottom of the electrolyte bath and the other end was attached to a horizontal cantilever. Changes in the length of the nanotube paper strip deflected the cantilever, whose movement was measured using an attached mirror and the Fotonic optical sensor used in Example 6. The actuator displacement was calculated by taking into account the correction of the distance between the mirror and the connection point of the carbon nanotube paper strip as well as the length of the cantilever. When calculating strain, the length of the immersion part of the carbon nanotube paper in the electrolyte was used rather then the total length of the carbon nanotube strip. This is because only the immersed part of the nanotube strip provides the actuation. The results of these measurements for a triangular applied waveform (corresponding to a sweep rate of 100 mV/s) are provided in FIG. 4, where the potential is versus SCE. Like the field dependence for ferroelectrics, this plot of deformation versus potential shows increasing hysteresis with increasing potential range during cyclic voltammetry. The direction of strain change reverses at 0.56 V on increasing potential and at 0.27 V on decreasing potential for the highest voltage scan. The strain-voltage coefficient for the quasi-linear region between −0.2 V and −0.8 V is 0.11%/volt. At very high applied potentials, faradaic electrochemical reactions occurred. The maximum actuator strain that was observed exceeded 0.2%, which is higher than can be obtained for high modulus ferroelectrics.

EXAMPLE 8

This example describes initial evaluation of the actuator lifetime. The actuator described in Example 7 was cycled between ±0.5 V (relative SCE) at 1 cycle/sec and constant scan rate using a potentiostat. Cycling the strip of nanotube paper for 140,000 cycles resulted in a ~33% decrease in actuator stroke.

EXAMPLE 9

This example demonstrates that the carbon nanotube actuator can be used up to high frequencies. The power supply for the present measurement was a potentiostat that was controlled by a function generator. A square waveform was used whose maximum and minimum potentials were +0.5 and −0.5 V (relative to SCE). The actuator configuration was the same as in Example 7. At frequencies below 5 Hz, the displacement was recorded using an X-Y plotter. The X- and Y-axes were connected to the Fotonic sensor and potentiostat, respectively. Thus, the X-axis records the displacement at any given voltage while the Y-axis shows the voltage. At frequencies above 5 Hz, the X-Y plotter result is no longer able to record the actual displacement because of the low response speed of the mechanical recorder. Hence, when the frequency was above 5 Hz, the displacement was measured using the peak-peak displacement mode of the Fotonic sensor. The results are shown in FIG. 5. FIG. 6 shows the measured time dependence of the strain for an applied square wave potential of ±0.5 V (versus SCE) having the frequencies indicated in this figure.

EXAMPLE 10

This example demonstrates the fabrication and operation of an air-operated carbon nanotube electromechanical actuator (a bimorph) that uses a solid-state electrolyte. Poly(vinyl alcohol) (6.76 g, Aldrich, 100% hydrolyzed, average M.W.= 14,000), which is abbreviated PVA, was placed into 200 mL deionized water to form a water suspension. The PVA suspension in water was heated until nearly boiling. After stirring for about 30 minutes, a clear solution of PVA in water was obtained. To the above solution, phosphoric acid (4.66 g, Aldrich, 85% by weight) was added. This yielded a solution having a ratio of $H_3PO_4$ to $CH_2CHOH$ (repeat unit of PVA) of about ¼. A very thin film of the polymeric electrolyte was obtained by casting the PVA/phosphoric acid aqueous solution on a Teflon plate and drying in air overnight. The obtained high quality film was transparent. Two pieces of the carbon nanotube paper having a width of about 3 mm, a thickness of about 25 micrometer, and a length of 3 cm were wetted one side with the above aqueous PVA/ phosphoric acid solution. The wetted side of the nanotube paper was pressed by hand onto the PVA polymeric electrolyte film. In the same way, the other piece of the nanotube paper was bonded on the opposite side of the electrolyte film. After cutting the excess PVA film from the periphery of the carbon nanotube strips, a cantilever actuator was obtained. Upon applying an alternating potential of about 2 V to the nanotube paper strips, the actuator vibrated and the tip displacement was up to 5 mm. The amplitude of vibration increased with increasing applied voltage and decreased with increasing frequency. The actuator showed visible vibration up to about 12 Hz. Above this frequency, the vibration was not obvious, perhaps due to the driving frequency being above the cantilever natural resonance frequency.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An actuator comprising:
   at least one ionically conducting and electronically insulating electrolyte; and
   at least two electronically conducting electrodes separated by said at least one electrolyte, at least one electrode of said at least two electronically conducting electrodes being a porous solid with a skeletal density in gm/cm$^3$ of $\rho$ having an accessible gravimetric surface area of at least 150 $\rho^{-1}$ m$^2$/gm and an accessible gravimetric capacitance of at least 5 $\rho^{-1}$ F/gm and having pores containing an electrolyte that is ionically conducting,
   the at least one electrode undergoing a response that provides, in whole or in part, an actuator output upon non-faradaic charge injection responsive to application of an electrical voltage between said at least two electronically conducting electrodes.

2. The actuator of claim 1, which provides an actuator output that is one of a mechanical displacement; control of either thermal, electrical, or fluid transport; or either switching, phase shift, or attenuation of electromagnetic radiation.

3. The actuator of claim 1, wherein the actuator output substantially originates from either change of dimension, surface energy, an optical property, or an electrical property of the at least one electrode as a result of non-faradaic electrode charging.

4. The actuator of claim 1, wherein the at least one electrode undergoes less than a 5% change in weight upon undergoing the actuator response to provide a useful actuator output.

5. The actuator of claim 4, wherein the at least one electrode has a maximum electronic conductivity that is above 1 S/cm, and wherein a ratio of the maximum electronic conductivity of a highest conductivity electrode to an electronic conductivity of the electrolyte that is ionically conducting and electronically insulating is above 10$^5$.

6. The actuator of claim 1, wherein said at least one electrolyte comprises either (a) an aqueous salt solution of an alkali metal cation and a halogen anion, (b) a solid state electrolyte, or (c) an aqueous solution of either sulfuric acid or KOH having a molar concentration above 4 M.

7. The actuator of claim 6, wherein said at least one electrolyte is aqueous NaCl, blood, or seawater.

8. The actuator of claim 1, wherein the at least one electrode comprises an electrode formed by:
   (a) crystallizing spheres of a first material into a porous first structure having three-dimensional periodicity and voids between the spheres;
   (b) infiltrating the porous first structure with a second material to form a composite structure of the first and second materials; and
   (c) removing the first material from the composite structure to form a porous second structure comprising the second material.

9. The actuator of claim 8, wherein the second material is either comprised of graphite or a precursor to graphite.

10. The actuator of claim 2, wherein the at least one electrode is part of either an optical switch in an electroptical circuit, an electrochromic element on a display, or an electrically switchable window.

11. The actuator of claim 3, wherein the at least one electrode is one part of a fluid control valve, wherein valve operation results from an electrically controlled change in surface energy of the at least one electrode that is in a form of either a pipe or a sheet.

12. The actuator of claim 1, wherein the at least one electrode comprises a form of carbon.

13. The actuator of claim 12, wherein the form of carbon comprises either single-wall, multi-wall, or scroll carbon nanotubes.

14. The actuator of claim 12, wherein the at least one electrode is in the form of a sheet comprising single-wall carbon nanotubes.

15. The actuator of claim 12, wherein the form of carbon comprises separated sheets of graphite dispersed in a solid electrolyte and percolated in the solid electrolyte.

16. The actuator of claim 1, wherein one or more of said at least two electronically conducting electrodes comprises a conducting organic polymer.

17. The actuator of claim 1, wherein two electrodes of said at least two electronically conducting electrodes are electrolyte filled porous solids that (a) undergo an actuator response upon non-faradaic charge injection and (b) have an accessible gravimetric surface area of at least 150 $\rho^{-1}$ m$^2$/gm and an accessible gravimetric capacitance of at least 5 $\rho^{-1}$ F/g.

18. The actuator of claim 2, that is an electromechanical actuator providing mechanical displacement capable of accomplishing mechanical work in response to application of the electrical voltage between said at least two electronically conducting electrodes.

19. The actuator of claim 18, wherein the at least one electrode is a sheet comprised of carbon single-wall nanotubes, wherein an in-plane Young's modulus of the sheet is at least 0.5 GPa.

20. The actuator of claim 18, wherein an electrical energy is generated as an output from said at least two electronically conducting electrodes responsive to one or more time varying mechanical strains on the at least one electrode.

21. The actuator of claim 2, wherein said at least two electronically conducting electrodes each comprise a porous thermoelectric having a thermoelectric coefficient that is electrically switched by substantially non-faradaic charge injection.

22. The actuator of claim 1, wherein said at least two electronically conducting electrodes comprise a working electrode and a counter electrode, the working and counter electrodes and said at least one electrolyte being interpenetrating elements in a single composite structure.

23. The actuator of claim 1, comprising the at least one electrode that operates non-faradaically and a counter electrode that operates faradaically.

24. The actuator of claim 23, wherein the at least one electrode is predominately surface coated with ions during actuation and the counter electrode is a solid electrode that is predominately infiltrated with ions that insert therein during actuation.

25. The actuator of claim 1, wherein above 25% of pore volume of the at least one electrode that is either two-dimensionally accessible or three-dimensionally accessible by the electrolyte that is ionically conducting has an effective radius of above 20 Å.

26. The actuator of claim 1, wherein an electrical energy is chemically or photochemically generated using said at least two electronically conducting electrodes as one of battery electrodes, fuel cell electrodes, and electrodes of a photo-rechargeable battery.

27. The actuator of claim 26, wherein said at least two electronically conducting electrodes are electrodes of a photo-rechargeable battery, one of said at least two electronically conducting electrodes being a transition metal chalcogenide.

28. The actuator of claim 26, wherein said at least two electronically conducting electrodes are battery electrodes, wherein one of said at least two electronically conducting electrodes is comprised of lithium and another of said at least two electronically conducting electrodes that provides the actuator response is comprised of carbon nanofibers, the electrolyte that is ionically conducting and electronically insulating being comprised of a lithium salt and either thionyl chloride ($SOCl_2$) or $SO_2$.

29. The actuator of claim 28, wherein the actuator response is mechanical displacement.

30. An electromechanical actuator comprising:
at least one ionically conducting and electronically insulating electrolyte; and
at least two electronically conducting electrodes separated by said at least one electrolyte, at least one electrode of said at least two electronically conducting electrodes being a porous solid having an accessible gravimetric surface area of at least 150 $m^2$/gm and an accessible gravimetric capacitance of at least 5 F/gm, having a mechanical modulus of at least 0.5 GPa and having pores containing an electrolyte that is ionically conducting,
the at least one electrode undergoing a dimensional change that provides, in whole or in part, an actuator output upon non-faradaic charge injection responsive to application of an electrical voltage between said at least two electronically conducting electrodes.

31. The electromechanical actuator of claim 30, wherein the at least one electrode is comprised of carbon nanotubes having a number-average diameter of less than about 10 nm.

32. The electromechanical actuator of claim 31, wherein the carbon nanotubes are predominately single-wall carbon nanotubes.

33. The electromechanical actuator of claim 32, wherein the single-wall carbon nanotubes are predominately (10, 10) nanotubes.

34. The electromechanical actuator of claim 32, wherein the single-wall carbon nanotubes are made by a laser-based process.

35. The electromechanical actuator of claim 33, wherein either more than 50% of the single-wall carbon nanotubes are non-bundled or the average number of carbon nanotubes in a bundle is less than about 50.

36. The electromechanical actuator of claim 32, wherein a number-average length-to-diameter ratio of the carbon nanotubes is above 1000.

37. The electromechanical actuator of claim 32, wherein the single-wall carbon nanotubes are configured as a sheet.

38. The electromechanical actuator of claim 37, wherein the sheet predominately comprises carbon single-wall nanotubes that are either biaxially oriented in a plane of the sheet or preferentially oriented in a particular in-plane direction.

39. The electromechanical actuator of claim 38, wherein a maximum in-plane electrical conductivity of the sheet is above 1000 S/cm.

40. The electromechanical actuator of claim 37, wherein an average tube length between inter-tube contacts divided by tube diameter for the sheet is below 100.

41. The electromechanical actuator of claim 37, wherein the sheet is formed by either filtration of a dispersion of carbon nanotubes in a carrier fluid or disposition of a mixture of carbon nanotubes and polymeric electrolyte in the carrier fluid, followed by evaporation of the carrier fluid.

42. The electromechanical actuator of claim 41, wherein the sheet is formed by filtration of a dispersion of single-wall nanotubes in the carrier fluid, a concentration of nanotubes in the carrier fluid being below about 0.1 mg/ml.

43. The electromechanical actuator of claim 38, wherein the sheet is annealed at a temperature of at least 400° C. and less than 2000° C. under either a substantially inert atmosphere or a hydrogen-containing atmosphere.

44. The electromechanical actuator of claim 31, wherein the at least one electrode is fabricated by applying an electrical voltage between two electrodes immersed in a carrier fluid containing carbon nanotubes.

45. The electromechanical actuator of claim 30, wherein the at least one electrode has an average thickness in a narrowest dimension of less than 0.5 millimeters.

46. The electromechanical actuator of claim 30, wherein a maximum thickness of said at least one electrolyte that separates said at least two electronically conducting electrodes is less than 1 millimeter and said at least one electrolyte is either a solid-state electrolyte or an organic electrolyte.

47. The electromechanical actuator of claim 30, wherein said at least one electrolyte comprises either (a) an aqueous salt solution of an alkali metal cation and a halogen anion, (b) a solid state electrolyte, or (c) an aqueous solution of either sulfuric acid or KOH having a molar concentration above 4 M.

48. The electromechanical actuator of claim 30, wherein said at least one electrolyte is aqueous NaCl, human blood, or seawater.

49. The electromechanical actuator of claim 30, wherein said at least two electronically conducting electrodes comprise more than two current carrying electrodes operable at different voltages.

50. The electromechanical actuator of claim 30, wherein the actuator output is controlled at least in part by determining a voltage of the at least one electrode with respect to one or more other of said at least two electronically conducting electrodes.

51. The electromechanical actuator of claim 50, wherein at least one of the one or more other electronically conducting electrodes transports negligible current.

52. The electromechanical actuator of claim 30, wherein the actuator output is controlled at least in part by determining either a current that flows between said at least two electronically conducting electrodes or an integral of the current over a time period.

53. The electromechanical actuator of claim 30, wherein the actuator output is controlled at least in part by measuring an optical property change of at least one of said at least two electronically conducting electrodes during actuation.

54. The electromechanical actuator of claim 30, wherein mechanical actuation results from charge injection in the at least one electrode, an opposing electrode of said at least two electronically conducting electrodes for current flow having a total surface area larger than a total surface area of the at least one electrode by at least a factor of ten.

55. The electromechanical actuator of claim 30, wherein the at least two electronically conducting electrodes are in sheet electrode form and comprise one or more monomorph or bimorph cantilever devices, wherein a sheet electrode is either (a) mechanically connected on one sheet side with a layer of an electromechanically inactive material or (b) mechanically connected on one sheet side with an electrolyte layer, which is mechanically connected on an opposite electrolyte sheet side with another sheet electrode.

56. The electromechanical actuator of claim 55, comprising more than one interconnected cantilevers.

57. The electromechanical actuator of claim 30, wherein the at least one electrode is mechanically connected to an optical fiber and deflects an end of the optical fiber, responsive to application of the electrical voltage, to move the end of the optical fiber between ends of two or more neighboring optical fibers that are substantially coaxial with the optical fiber.

58. The electromechanical actuator of claim 57, wherein the at least one electrode is adhesively connected to the optical fiber as a semicircular strip that runs approximately parallel to an axis of the optical fiber, a dimensional change of the at least one electrode as a result of non-faradaic charge injection contributing to bending of the optical fiber.

59. The electromechanical actuator of claim 58, wherein said at least two electronically conducting electrodes comprise either two, three, or four electrodes that are adhesively connected to the optical fiber and that run approximately parallel to the axis of the optical fiber, application of differing relative voltages between the plural electrodes that are electrically separated and ionically connected displacing the optical fiber in either one or more directions.

60. The electromechanical actuator of claim 58, wherein the at least one electrode comprises single-wall carbon nanotubes contacted with one or more liquid electrolytes or solid electrolytes that substantially fill pore volume and provide an inter-electrode path for ions.

61. The electromechanical actuator of claim 60, wherein the inter-electrode path for ions is provided by a liquid electrolyte having approximately a same refractive index as a core of the optical fiber at an optical wavelength that can be transmitted along the optical fiber.

62. The electromechanical actuator of claim 30, wherein the actuator output is a mechanical displacement that regulates thermal contact between two bodies, one of which is cooled as a result of the thermal contact.

63. The electromechanical actuator of claim 62, wherein one of said two bodies comprises a thermoelectric having an electrical current pulsed therethrough, said at least two electronically conducting electrodes providing a mechanical displacement opening thermal contact between the two bodies.

64. The electromechanical actuator of claim 30, wherein a mechanical strain applied to at least one of said at least two electronically conducting electrodes generates an inter-electrode voltage change that causes current flow.

65. The electromechanical actuator of claim 64, wherein either said at least one electrolyte causes faradaic charge injection at zero applied potential or a bias voltage is applied between said at least two electronically conducting electrodes.

66. The electromechanical actuator of claim 64, comprising arrays of said at least two electronically conducting electrodes that are electircally connected in series, so as to additively combine the inter-electrode voltages generated in the array by application of the mechanical strain to one or more of said at least two electronically conducting electrodes.

67. The electromechanical actuator of claim 30, wherein the at least one electrode is a sheet that is penetrated on opposite sheet sides by respective materials having different ionic conductivities, wherein a first respective material is solid and a second respective material is liquid.

68. A mechanical actuator for converting chemical energy to electrical energy and converting the electrical energy to a mechanical displacement, comprising:
first and second electrodes that are electronically conductive and contain a catalyst for oxidation or reduction, said first and second electrodes being porous and filled with an electrolyte,
at least one electrode of said first and second electrodes having a gravimetric surface area of at least 150 $m^2/gm$ and undergoing a dimensional change responsive to non-faradaic charging;
an electrolyte separating said first and second electrodes, said separating electrolyte being substantially gas impermeable, ionically conductive, and electronically insulating;
means for contacting said first electrode with a first reactant that is oxidizable; and
means for separately contacting said second electrode with a second reactant that is reducible,
the at least one electrode being mechanically displaced responsive to at least one of controlling flow of said first and second reactants to said first and second electrodes and electrically connecting said first and second electrodes either directly or indirectly.

69. The mechanical actuator of claim 68, wherein the electrical energy is generated by supplying one of gaseous hydrogen, methanol, and $NH_2NH_2$ as said first reactant to said first electrode and oxygen or air as said second reactant to said second electrode.

70. The mechanical actuator of claim 68, wherein the at least one electrode comprises sheets of carbon nanotubes having a number-average diameter of less than about 10 nm.

71. The mechanical actuator of claim 68, wherein said first and second electrodes form a cylindrical shaped object of changeable shape that provides the mechanical displacement, said first reactant being provided at an interior of the mechanical actuator along said first electrode and said second reactant being provided within an exterior of the mechanical actuator along said second electrode.

72. The mechanical actuator of claim 68, wherein said first and second electrodes are hollow, said first reactant being provided to the mechanical actuator through a hollow of said first electrode and said second reactant being provided to the mechanical actuator through a hollow of said second electrode.

73. The mechanical actuator of claim 68, wherein said first and second reactants are gas or liquid.

74. An electromechanical microactuator comprising:
a first electrode that is electronically conducting and having a thickness in a narrowest dimension of less than 10 nm, a gravimetric surface area of at least 150 $m^2/gm$, and a capacitance of at least 5 F/gm;
a second electrode that is electronically conducting serving as a counter electrode to said first electrode; and
an electronically insulating electrolyte providing an ionically conducting path between said first and second electrodes,
said first electrode being mechanically displaced responsive to application of a voltage between said first and second electrodes.

75. The electromechanical microactuator of claim 74, wherein said first electrode comprises at least one carbon nanotube.

76. The electromechanical microactuator of claim 75, wherein said carbon nanotube is a single-wall carbon nanotube.

77. The electromechanical microactuator of claim 74, wherein said second electrode has a total surface area that is at least 100 times larger than a total surface area of said first electrode.

* * * * *